(12) United States Patent
Oobayashi et al.

(10) Patent No.: US 8,946,331 B2
(45) Date of Patent: Feb. 3, 2015

(54) POLYPROPYLENE RESIN COMPOSITION AND FORMED ARTICLE

(75) Inventors: Yoshiaki Oobayashi, Chiba (JP); Tsuyoshi Watanabe, Ichihara (JP)

(73) Assignee: Sumitomo Chemical Company, Limited, Tokyo (JP)

(*) Notice: Subject to any disclaimer, the term of this patent is extended or adjusted under 35 U.S.C. 154(b) by 612 days.

(21) Appl. No.: 11/325,568

(22) Filed: Jan. 5, 2006

(65) Prior Publication Data

US 2006/0155073 A1 Jul. 13, 2006

(30) Foreign Application Priority Data

Jan. 7, 2005 (JP) ................................ 2005-002268

(51) Int. Cl.
| | | |
|---|---|---|
| C08L 23/12 | (2006.01) | |
| C08L 23/00 | (2006.01) | |
| C08L 53/00 | (2006.01) | |
| C08F 297/08 | (2006.01) | |
| C08F 210/06 | (2006.01) | |
| C08L 23/10 | (2006.01) | |
| C08L 23/16 | (2006.01) | |

(52) U.S. Cl.
CPC ........... C08F 210/06 (2013.01); C08F 297/083 (2013.01); C08L 23/16 (2013.01); C08L 23/10 (2013.01); C08F 297/08 (2013.01); C08L 53/00 (2013.01)
USPC ............... 524/399; 524/396; 525/88; 525/95; 525/240; 525/242

(58) Field of Classification Search
USPC ....................... 521/142; 525/88, 95, 240, 242; 524/451, 399, 396; 526/59, 60, 61, 526/351, 901
See application file for complete search history.

(56) References Cited

U.S. PATENT DOCUMENTS

| | | | |
|---|---|---|---|
| 4,956,426 A * | 9/1990 | Ardell et al. ..................... 526/60 |
| 5,629,076 A * | 5/1997 | Fukasawa et al. ............ 428/220 |
| 5,829,804 A | 11/1998 | Saeki et al. | |
| 5,914,363 A | 6/1999 | Sadatoshi et al. | |
| 6,143,813 A * | 11/2000 | Sezume et al. ................ 524/127 |
| 6,156,842 A * | 12/2000 | Hoenig et al. ................ 525/171 |
| 6,214,934 B1 | 4/2001 | Moriya et al. | |
| 6,306,972 B1 * | 10/2001 | Ohkawa et al. ............... 525/240 |
| 6,306,973 B1 * | 10/2001 | Takaoka et al. ............... 525/240 |
| 6,441,081 B1 | 8/2002 | Sadatoshi et al. | |
| 6,562,890 B2 * | 5/2003 | Dotson ......................... 524/396 |
| 6,759,465 B1 * | 7/2004 | Shimojo et al. ............... 524/451 |
| 7,144,939 B2 * | 12/2006 | Dotson et al. ................. 524/394 |
| 2002/0035206 A1 * | 3/2002 | Kurasawa et al. ............ 525/132 |
| 2003/0073764 A1 * | 4/2003 | Zhao ............................ 524/108 |
| 2003/0216499 A1 | 11/2003 | Oobayashi | |
| 2005/0075434 A1 * | 4/2005 | Mannion et al. .............. 524/285 |

FOREIGN PATENT DOCUMENTS

| | | |
|---|---|---|
| EP | 0 132 968 A2 | 2/1985 |
| EP | 0 534 776 A1 | 3/1993 |
| EP | 0 699 711 A1 | 3/1998 |
| JP | 62-236852 A | 10/1987 |
| JP | 62-241947 A | 10/1987 |
| JP | 02-49047 A | 2/1990 |
| JP | 07-184806 A | 7/1995 |
| JP | H0873547 A | 3/1996 |
| JP | H0885714 A | 4/1996 |
| JP | 2004083852 A | 3/2004 |
| JP | 2004115569 A | 4/2004 |
| WO | WO 02/079312 A1 | 10/2002 |

OTHER PUBLICATIONS

Ferrage et al. "Talc as nucleating agent of polypropylene: morphology induced by lamellar particles additiona and interface mineral-matrix modelization." (2002). Journal of Materials Scicene. vol. 37. pp. 1561-1573.*
Derwent Abstract Accession No. 2002-460669/49 KR 2001109721 A, Dec. 12, 2001, Abstract.
Japanese Patent Office, "Notification of Reasons for Rejection," issued in connection with Japanese Patent Application No. 2006-001196, dated May 31, 2011.

* cited by examiner

Primary Examiner — Kara Boyle
(74) Attorney, Agent, or Firm — Sughrue Mion, PLLC

(57) ABSTRACT

Disclosed is a polypropylene resin composition including: 100 parts by weight of (A) a propylene-based block copolymer including polymer components (I) and (II), wherein the polymer component (I) is a propylene polymer having an intrinsic viscosity $[\eta]_I$ of 0.1-5 dl/g, the polymer component (II) is a propylene polymer comprising propylene units and units of at least one comonomer selected from the group consisting of ethylene and α-olefins having 4-12 carbon atoms and having an intrinsic viscosity $[\eta]_{II}$ of from 1-20 dl/g and the content of the polymer component (II) is 1-70% by weight; and 0.001-5 parts by weight of (B) a nucleating agent composed of particles having an average particle diameter, as measured by the laser diffraction method, of 0.01-3 mm wherein particles having particle diameters of not less than 10 mm account for less than 5% by weight of all the particles of the nucleating agent.

6 Claims, 1 Drawing Sheet

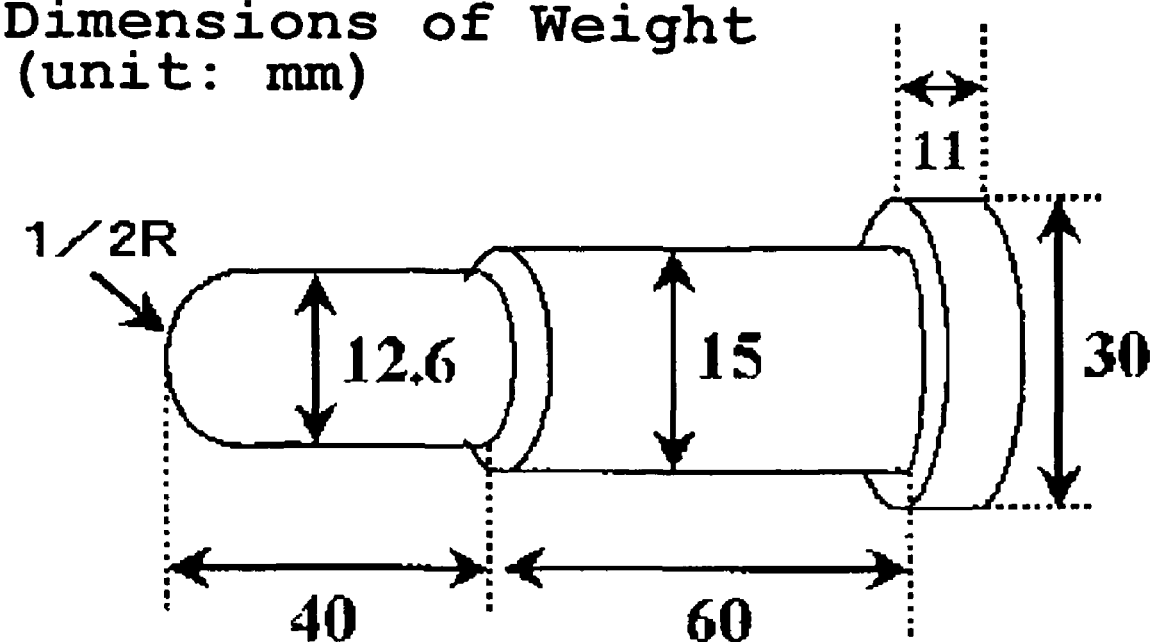

POLYPROPYLENE RESIN COMPOSITION AND FORMED ARTICLE

BACKGROUND OF THE INVENTION

1. Field of the Invention

The present invention relates to a polypropylene resin composition and to a formed article comprising the same. In particular, the invention relates to a polypropylene resin composition superior in rigidity and impact resistance and also particularly superior in drop weight impact strength, and to a formed article made of the same.

2. Description of the Related Art

A polypropylene resin composition including a polypropylene resin and a nucleating agent contained therein is a material with superior mechanical properties. It therefore is used for a wide variety of applications as a material for forming molded articles such as automotive interior or exterior components, home electric materials, containers and sundries.

For example, JP 2-49047 A discloses a propylene polymer composition including a propylene homopolymer with a specific intrinsic viscosity satisfying a specific relationship together with the isotactic pentad fraction of the propylene homopolymer, and an organic phosphorus compound with a specific structure as a nucleating agent, wherein the number of particles of the organic phosphorus compound with a specific size which are contained in a unit weight of the composition is within a specific range.

JP 5-194685 A discloses an ethylene-propylene block copolymer including a crystalline polypropylene portion and an ethylene-propylene random copolymer portion wherein the crystalline polypropylene portion has an intrinsic viscosity, Q factor and content of 20° C. xylene-soluble component each within a specific range, the ethylene-propylene random copolymer portion has an intrinsic viscosity within a specific range and the block copolymer has a content of the copolymer portion within a specific range. The reference also discloses that a nucleating agent may be added for a desired purpose.

Even for the polypropylene resin compositions disclosed in the above-cited references, there is a demand for further improvement in rigidity and impact resistance, and particularly, improvement in drop weight impact strength.

SUMMARY OF THE INVENTION

An object of the present invention is to provide a polypropylene resin composition superior in rigidity and impact resistance, particularly superior in drop weight impact strength, and also provide molded articles made of the same.

The present invention provides, in one aspect, a polypropylene resin composition comprising: (A) a propylene-based block copolymer satisfying requirements (a), (b), (c) and (d) defined below, (B) from 0.001 to 5 parts by weight, based on 100 parts by weight of (A), of a nucleating agent composed of particles having an average particle diameter, as measured by the laser diffraction method, of from 0.01 to 3 μm wherein particles having particle diameters of not less than 10 μm account for less than 5% by weight of all the particles of the nucleating agent;

requirement (a): propylene-based block copolymer (A) is a propylene-based block copolymer including a polymer component (I) and a polymer component (II), wherein the polymer component (I) is a propylene polymer having an intrinsic viscosity $[\eta]_I$, as measured in Tetralin at 135° C., of from 0.1 to 5 dl/g and the polymer component (II) is a propylene polymer comprising propylene units and units of at least one comonomer selected from the group consisting of ethylene and α-olefins having 4-12 carbon atoms and having an intrinsic viscosity $[\eta]_{II}$, as measured in Tetralin at 135° C., of from 1 to 20 dl/g, requirement (b): the polymer component (I) has an isotactic pentad fraction (mmmm fraction), as measured by $^{13}$C-NMR, of 0.98 or more, requirement (c): the content of the units derived from at least one comonomer selected from the group consisting of ethylene and α-olefins having 4-12 carbon atoms included in the polymer component (II) is from 1 to 80% by weight, provided that the overall amount of the polymer component (II) is 100% by weight, requirement (d): the content of the polymer component (II) is from 1 to 70% by weight, provided that the weight of the propylene-based block copolymer (A) is 100% by weight.

In a preferred embodiment, in the propylene-based block copolymer (A), the ratio of the intrinsic viscosity $[\eta]_{II}$ of the polymer component (II) to the intrinsic viscosity $[\eta]_I$ of the polymer component (I) is from 1 to 20 and the content of the polymer component (II) is from 10 to 50% by weight and wherein the polypropylene resin composition has a melt flow rate, as measured at 230° C., of from 0.1 to 400 g/10 min, or the nucleating agent (B) is an organic nucleating agent composed of particles having an average particle diameter, as measured by the laser diffraction method, of from 0.01 to 3 μm wherein particles having particle diameters of not less than 10 μm account for 1% by weight or less of all the particles of the nucleating agent.

In another aspect, the present invention provides a formed article made from the polypropylene resin composition mentioned above.

According to the present invention, it is possible to obtain a polypropylene resin composition superior in rigidity and impact resistance and also particularly superior in drop weight impact strength, and to obtain a formed article made from the same.

BRIEF DESCRIPTION OF THE DRAWINGS

FIG. 1 is a schematic perspective diagram of the weight used for the drop weight impact strength test in Examples and Comparative Examples.

DESCRIPTION OF THE PREFERRED EMBODIMENT

Propylene-based block copolymer (A) is a propylene-block copolymer which satisfying requirements (a), (b), (c) and (d) defined below.

requirement (a): propylene-based block copolymer (A) is a propylene-based block copolymer including a polymer component (I) and a polymer component (II), wherein the polymer component (I) is a propylene polymer having an intrinsic viscosity $[\eta]_I$, as measured in Tetralin at 135° C., of from 0.1 to 5 dl/g and the polymer component (II) is a propylene polymer comprising propylene units and units of at least one comonomer selected from the group consisting of ethylene and α-olefins having 4-12 carbon atoms and having an intrinsic viscosity $[\eta]_{II}$, as measured in Tetralin at 135° C., of from 1 to 20 dl/g, requirement (b): the polymer component (I) has an isotactic pentad fraction, as measured by $^{13}$C-NMR, of 0.98 or more, requirement (c): the content of the units derived from at least one comonomoer selected from the group consisting of ethylene and α-olefins having 4-12 carbon atoms included in the polymer component (II) is from 1 to 80% by weight, provided that the overall amount of the polymer component (II) is 100% by weight, requirement (d): the content of the polymer component (II) is from 1 to 70% by weight, provided that the weight of the propylene-based block copolymer (A) is 100% by weight.

Polymer component (I) is a propylene homopolymer component or a propylene-based copolymer component composed mainly of units derived from propylene. When the polymer component (I) is a propylene-based copolymer component composed mainly of units derived from propylene, it is a propylene-based copolymer portion composed of units derived from at least one comonomer selected from the group consisting of ethylene and α-olefins having 4-12 carbon atoms and a major amount of units derived from propylene.

When the polymer component (I) is a propylene-based copolymer component composed mainly of units derive from propylene, the content of the units derived from at least one comonomoer selected from the group consisting of ethylene and α-olefins having 4-12 carbon atoms is from 0.01 to 30% by weight, provided that the overall amount of the polymer component (I).

Examples of the α-olefin having from 4 to 12 carbon atoms include 1-butene, 1-pentene, 1-hexene, 4-methyl-1-pentene, 1-octene and 1-decene. Preferred are 1-butene, 1-hexene and 1-octene.

Examples of the copolymer component composed mainly of units derived from propylene include propylene-ethylene copolymer components, propylene-1-butene copolymer components, propylene-1-hexene copolymer components, propylene-ethylene-1-butene copolymer components, propylene-ethylene-1-hexene copolymer components, propylene-ethylene-1-octene copolymer components and propylene-1-octene copolymer components.

Polymer component (II) is a propylene-based copolymer composed of units derived from at least one comonomer selected from the group consisting of ethylene and α-olefins having 4-12 carbon atoms and units derived from propylene.

The content of the units derived from at least one comonomoer selected from the group consisting of ethylene included in the polymer component (II) and α-olefins having 4-12 carbon atoms is from 1 to 80% by weight, preferably from 20 to 70% by weight, and more preferably from 30 to 60% by weight, provided that the overall amount of the polymer component (II) is 100% by weight.

The α-olefins having 4-12 carbon atoms to be used may, for example, be the same as α-olefins having 4-12 carbon atoms used for polymer component (I).

Examples of polymer component (II) include propylene-ethylene copolymer components, propylene-ethylene-1-butene copolymer components, propylene-ethylene-1-hexene copolymer components, propylene-1-butene copolymer components and propylene-1-hexene copolymer components.

Examples of propylene-based copolymer (A) for use in the present invention include (propylene)-(propylene-ethylene) copolymers, (propylene)-(propylene-ethylene-1-butene) copolymers, (propylene)-(propylene-ethylene-1-hexene) copolymers, (propylene)-(propylene-1-butene) copolymers, (propylene)-(propylene-1-hexene) copolymers, (propylene-ethylene)-(propylene-ethylene) copolymers, (propylene-ethylene)-(propylene-ethylene-1-butene) copolymers, (propylene-ethylene)-(propylene-ethylene-1-hexene) copolymers, (propylene-ethylene)-(propylene-1-butene) copolymers, (propylene-ethylene)-(propylene-1-hexene) copolymers, (propylene-1-butene)-(propylene-ethylene) copolymers, (propylene-1-butene)-(propylene-ethylene-1-butene) copolymers, (propylene-1-butene)-(propylene-ethylene-1-hexene) copolymers, (propylene-1-butene)-(propylene-1-butene) copolymers, and (propylene-1-butene)-(propylene-1-hexene) copolymers.

The content of the polymer component (II) included in the propylene-based block polymer (A) is from 1 to 70% by weight, preferably from 5 to 50% by weight, more preferably from 10 to 50% by weight, and even more preferably from 20 to 50% by weight, provided that the whole weight of the propylene-based block copolymer (A) is 100% by weight.

Propylene-based block copolymer (A) is preferably a propylene-block copolymer wherein polymer component (I) is a propylene homopolymer component and polymer component (II) is a propylene-based copolymer component which is a copolymer including units derived from at least one comonomer selected from the group consisting of ethylene and α-olefins having 4-12 carbon atoms and units derived from propylene.

Propylene-based block copolymer (A) is more preferably a propylene-based block copolymer in which polymer component (II) is a copolymer component made up of propylene and ethylene, the content of the polymer component (II) being from 5 to 50% by weight and the content of units derived from ethylene included in the polymer component (II) being from 20 to 70% by weight.

The intrinsic viscosity $[\eta]_I$ of polymer component (I), as measured in Tetralin at 135° C., is from 0.1 to 5 dl/g, preferably from 0.3 to 4 dl/g and more preferably from 0.5 to 3 dl/g. When the intrinsic viscosity $[\eta]_I$ is greater than 5 dl/g, the mechanical properties or molding processability of a resulting polypropylene resin composition may fail. When $[\eta]_I$ is less than 0.1 dl/g, the molding processability may be insufficient.

The intrinsic viscosity $[\eta]_{II}$ of polymer component (II) as measured in Tetralin at 135° C. is from 1 to 20 dl/g, preferably from 1 to 10 dl/g, more preferably from 2 to 7 dl/g, and even more preferably from 3 to 7 dl/g. When the intrinsic viscosity $[\eta]_{II}$ is greater than 20 dl/g, the mechanical properties or molding processability of a resulting polypropylene resin composition may fail. When $[\eta]_{II}$ is less than 1 dl/g, the molding processability may be insufficient.

The ratio of the intrinsic viscosity $[\eta]_{II}$ of polymer component (II) to the intrinsic viscosity $[\eta]_I$ of polymer component (I) is preferably from 1 to 20, more preferably from 2 to 10, and more preferably from 3 to 8.

The intrinsic viscosity (unit: dl/g) is measured by the method described below at a temperature of 135° C. using Tetralin as solvent.

Reduced viscosities are measured at three concentrations of 0.1, 0.2 and 0.5 g/dl using a Ubbelohde's viscometer. The intrinsic viscosity is calculated by a calculation method described in "Kobunshi Yoeki (Polymer Solution), Kobunshi Jikkengaku (Polymer Experiment Study) vol. 11" page 491 (published by Kyoritsu Shuppan Co., Ltd., 1982), namely, by an extrapolation method in which reduced viscosities are plotted against concentrations and the concentration is extrapolated in zero. A powder of propylene-based block copolymer (A) collected from a polymerization reactor or its pellet is used as a sample. In the case of polymer component (I), a polymer powder partly collected from the polymerization reactor of the first stage is subjected to the measurement.

When propylene-based block copolymer (A) is a copolymer prepared by a method in which polymer component (I) is produced in a polymerization step of the first stage and polymer component (II) is produced in a step of the second stage, the contents of the polymer components (I), (II), and intrinsic viscosities $[\eta]_{Total}$, $[\eta]_I$ and $[\eta]_{II}$ are measured or calculated by the manners mentioned below. The intrinsic viscosity $[\eta]_{Total}$ is the intrinsic viscosity of the whole portion of propylene-based block copolymer (A)

The intrinsic viscosity $[\eta]_{II}$ of polymer component (II) produced in the step of the second stage is calculated according to the following formula on the basis of the intrinsic viscosity $[\eta]_I$ of polymer component (I) produced in the polymerization step of the first stage, the intrinsic viscosity $[\eta]_{Total}$ of the final polymer resulting from the polymerization step of the second stage, namely the combination of the components (I) and (II), and the content (weight ratio) of the polymer component (II) in the final polymer.

$$[\eta]_{II}=([\eta]_{Total}-[\eta]_I \times X_I)/X_{II}$$

$[\eta]_{Total}$: the intrinsic viscosity (dl/g) of the final polymer after the second polymerization step $[\eta]_I$: the intrinsic viscosity (dl/g) of the sample taken out from a polymerization reactor after the first polymerization step $X_I$: the weight ratio of the component produced in the polymerization in the first step $X_{II}$: the weight ratio of the component produced in the polymerization in the second step $X_I$ and $X_{II}$ are determined on the basis of the material balance during the polymerizations.

The melt flow rate (MFR), as measured at 230° C., of propylene-based block copolymer (A) is typically from 0.01 to 600 g/10 min, preferably from 0.1 to 400 g/10 min, and more preferably from 1 to 200 g/10 min.

The isotactic pentad fraction (mmmm fraction) of polymer component (I) included in propylene-based copolymer (A), which is measured by $^{13}$C-NMR, is 0.98 or more because such a block copolymer will be of high crystallinity and high rigidity.

The isotactic pentad fraction measured by 13C-NMR is a fraction of the propylene monomer units existing at the centers of the chains in which five propylene monomer units are successively meso-bonded to the pentad units in the polypropylene molecule, the fraction being determined by the method reported by A. Zambelli et al. in Macromolecules, 6, 925 (1973). The assignment of absorption peaks in an NMR spectrum is carried out according to the disclosure of Macromolecules 8, 687 (1975).

When propylene-based block copolymer (A) includes polymer component (I) which is a propylene-based polymer component composed mainly of units derived from propylene, the content of 20° C. xylene-soluble component (hereinafter, referred to as $CXS_{(I)}$) in the polymer component (I) is preferably less than 1.0% by weight, more preferably 0.8% by weight or less, and more preferably 0.5% by weight or less. When the content of $CSX_{(I)}$ is over 1.0% by weight, a polypropylene resin composition of the present invention using such a propylene-based block copolymer (A) may be insufficient in rigidity.

It is possible to prepare propylene-based block copolymer (A) using a conventional polymerization catalyst and a conventional polymerization technique.

Examples of the polymerization catalyst include Ziegler type catalysts, Ziegler-Natta type catalysts, catalyst systems comprising a compound of a transition metal of Group IV of the Periodic table having a cyclopentadienyl ring and alkylaluminoxane, and catalyst systems comprising a compound of a transition metal of Group IV of the Periodic table having a cyclopentadienyl ring, a compound capable of reacting with the foregoing compound to form an ionic complex and an organoaluminum compound. A prepolymerized catalyst prepared by prepolymerizing ethylene or α-olefin in the presence of those catalyst systems may also be used.

Examples of those catalyst systems include catalyst systems disclosed in JP 61-218606 A, JP 5-194685 A, JP 7-216017 A, JP 10-212319 A, JP 2004-182981 A and JP 9-316147 A.

Examples of the polymerization techniques include bulk polymerization, solution polymerization, slurry polymerization and vapor phase polymerization. Bulk polymerization is a method in which polymerization is carried out at a polymerization temperature using liquid olefin as solvent. Solution polymerization or slurry polymerization is a method in which polymerization is carried out in an inert hydrocarbon solvent such as propane, butane, isobutane, pentane, hexane, heptane and octane. Vapor phase polymerization is a method in which a gaseous monomer is polymerized in a medium wherein the gaseous monomer is used as the medium. These polymerization techniques may be carried out either batchwise or continuously. Moreover, these polymerization techniques may optionally be combined together. From the industrial and economic point of view, preferred are continuous vapor phase polymerization and bulk-vapor phase polymerization in which bulk polymerization and vapor phase polymerization are carried out successively.

The method for the preparation of propylene-based block copolymer (A) is a method in which the propylene-based block copolymer (A) is produced in multiple stages including at least two stages. Preferred is a method having at least two stages including a stage for producing polymer component (I) and a stage for producing polymer component (II).

Examples of such a multiple stage method include the methods of multiple stage polymerization disclosed in JP5-194685 A and JP 2002-12719 A.

The conditions of polymerization steps, namely polymerization temperature, polymerization pressure, monomer concentration, amount of catalyst to be charged, polymerization time, etc., may be changed and determined depending on a desired propylene-based block copolymer (A).

In the production of the propylene-based block copolymer (A), the propylene-based block copolymer (A) may, as required, be dried at a temperature equal to or lower than the temperature at which the block copolymer melts in order to remove a residual solvent contained in the propylene-based block copolymer (A) or oligomers with ultra low molecular weights produced during the production. Examples of the drying method include those described in JP 55-75410 A and the specification of Japanese Patent No. 2565753.

Nucleating agent (B) for use in the present invention is a nucleating agent composed of particles having an average particle diameter, as measured by the laser diffraction method, of from 0.01 to 3 μm wherein particles having particle diameters of not less than 10 μm account for less than 5% by weight of all the particles of the nucleating agent.

Nucleating agent (B) is preferably a nucleating agent composed of particles having an average particle diameter, as measured by the laser diffraction method, of from 0.01 to 3 μm wherein particles having particle diameters of not less than 10 μm account for less than 3% by weight of all the particles of the nucleating agent, and more preferably a nucleating agent composed of particles having an average particle diameter, as measured by the laser diffraction method, of from 0.01 to 2 μm wherein particles having particle diameters of not less than 10 μm account for less than 1% by weight of all the particles of the nucleating agent. The laser diffraction method is a method for measuring a particle size distribution using a laser diffraction particle size distribution analyzer "HELOS" available from Sympatec GmbH.

The nucleating agent (B) may be either an inorganic nucleating agent or an organic nucleating agent. Examples of the inorganic nucleating agent include ones conventionally known as nucleating agents for polypropylene resin, such as talc, clay and calcium carbonate. Examples of the organic nucleating agent include ones conventionally known as nucleating agents for polypropylene resin, such as metal salts of aromatic carboxylic acids, metal salts represented by general formula (II) shown later, metal salts of aromatic phosphoric acids, and polymer type nucleating agents, e.g. poly (3-methyl-1-butene), polycyclopentene and polyvinylcyclohexane.

When nucleating agent (B) is an inorganic nucleating agent such as talc, clay and calcium carbonate, the inorganic nucleating agent may be pretreated with a silane coupling agent, fatty acid, or other acidic or basic substance for the purpose of preventing aggregation of particles or improving the dispersibility to the propylene-based block copolymer.

The nucleating agent (B) may be prepared by a conventionally known method. Particles having an average particle diameter, as measured by the laser method, of from 0.01 to 3 μm wherein particles having particle diameters of not less than 10 μm account for less than 5% by weight can be produced by pulverization or solidification carried out under appropriately set conditions. For the purpose of preventing particles from aggregating during their production, they may be produced while being in contact with a surface treating agent.

The nucleating agent (B) is preferably at least one organic nucleating agent selected from metal salts of aromatic carboxylic acids, metal salts represented by general formula (II) and metal salts of aromatic phosphoric acids.

Examples of the metal salts of aromatic carboxylic acids include compounds having a group of a structure represented by

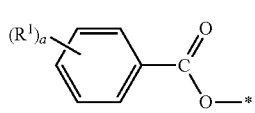

(I)

wherein $R^1$ denotes alkyl, cycloalkyl, alkylcycloalkyl, aralkyl or phenyl; a denotes the number of substituent(s) ($R^1$) linking to the aromatic group and is an integer of from 0 to 3, and * denotes the site of linking to a metal atom.

Examples of the metal atom in a metal salt of an aromatic carboxylic acid for use as nucleating agent (B) include metal atoms of Group 1 of the periodic table of the elements, metal atoms of Group 2, metal atoms of Group 4, metal atoms of Group 13, and metal atoms of Group 14. Preferred are metal atoms of Group 1, metal atoms of Group 2, or metal atoms of Group 13.

Specific examples of metal atoms of Group 1 include lithium, sodium and potassium. Examples of metal atoms of Group 2 include magnesium, calcium, strontium and barium. Examples of metal atoms of Group 4 include titanium and zirconium. Examples of metal atoms of Group 13 include aluminum and gallium. Examples of Group 14 include germanium, tin and lead.

When the nucleating agent (B) is a metal salt of an aromatic carboxylic acid, it is preferably lithium benzoate, potassium benzoate, sodium benzoate, aluminum benzoate, aluminum hydroxy-di(p-tert-butylbenzoate), sodium cyclohexanecarboxylate and sodium cyclopentanecarboxylate, more preferably sodium benzoate, aluminum hydroxy-di-(p-tert-butylbenzoate) and sodium p-tert-butylbenzoate, and even more preferably aluminum hydroxy-di-(p-tert-butylbenzoate) and sodium p-tert-butylbenzoate.

Examples of the metal salts represented by the following general formula (II) include compounds disclosed in JP 2004-524417 T and JP 2004-530006 T:

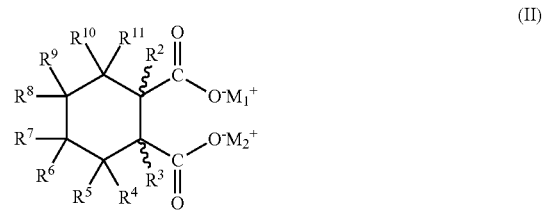

(II)

In formula (II), $M_1$ and $M_2$ are independently selected from the group consisting of sodium atom and hydrogen atom, provided that at least one of $M_1$ and $M_2$ is a sodium atom; $R^2$, $R^3$, $R^4$, $R^5$, $R^6$, $R^7$, $R^8$, $R^9$, $R^{10}$ and $R^{11}$ are independently selected from the group consisting of hydrogen, alkyl having 1-9 carbon atoms, hydroxyl group, alkoxy having 1-9 carbon atoms, alkyleneoxy having 1-9 carbon atoms, amino group, alkylamine having 1-9 carbon atoms, halogen atoms (fluorine atom, chlorine atom, bromine atom and iodine atom), and phenyl. When these are alkyl groups, the alkyl groups may be combined to form a carbon ring having up six carbon atoms. This compound may be either in the cis form or the trans form. Preferably, it is in the cis form.

The metal salts represented by general formula (II) are more preferably metal salts of hexahydrophthalic acid group. Disodium bicyclo(2,2,1)heptane-2,3-dicarboxylate, which is represented by the following structural formula, is more preferred.

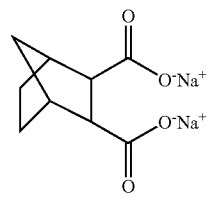

Examples of the metal salts of aromatic phosphoric acids include compounds represented by the following general formula (III) and general formula (IV):

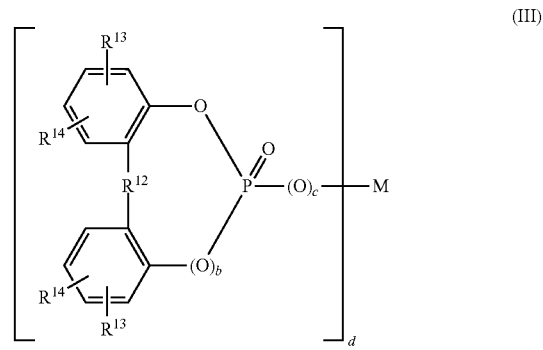

(III)

In formula (III), $R^{12}$ denotes a direct bond, sulfur atom or alkylidene; $R^{13}$ and $R^{14}$ independently represent hydrogen atom, alkyl or cycloalkyl; b and c are independently an integer 0 or 1; di represents the valence; and M represents a metal atom.

In the general formula (III), examples of the alkylidene represented by $R^{12}$ include methylidene, ethylidene, isopropylidene, butylidene, hexylidene, octylidene, nonylidene, cyclopentylidene, cyclohexylidene and cyclooctylidene.

Examples of the alkyl groups represented by $R^{13}$ and $R^{14}$ include methyl, ethyl, isopropyl, n-butyl, isobutyl, sec-butyl, tert-butyl, n-amyl, tert-amyl, hexyl, heptyl, n-octyl, 2-ethylhexyl, tert-octyl, nonyl, decyl, undecyl, dodecyl, tridecyl, tetradecyl, pentadecyl, hexadecyl, heptadecyl and octadecyl. In addition, cyclopentyl, cyclohexyl, cycloheptyl, cyclooctyl, etc. are also available. Examples of the metal atom represented by M include metal atoms of Group 1 of the periodic table of the elements, metal atoms of Group 2, metal atoms of Group 4, metal atoms of Group 13, and metal atoms of Group 14. Preferred are metal atoms of Group 1 and metal atoms of Group 2.

Specific examples of metal atoms of Group 1 include lithium, sodium and potassium. Examples of metal atoms of Group 2 include magnesium, calcium, strontium and barium. Examples of metal atoms of Group 4 include titanium and zirconium. Examples of metal atoms of Group 13 include aluminum and gallium. Examples of Group 14 include germanium, tin and lead.

The metal salt of aromatic phosphoric acid represented by general formula (III) is preferably a compound in which $R^{12}$ is a direct bond or methylidyne, the alkyl groups represented by $R^{13}$ and $R^{14}$ are tert-butyl groups, b is 1, c is 1, d is 1 and M is a metal atom of Group 1. More preferred are lithium 2,2'-methylenebis(4,6-di-tert-butylphenyl)phosphate, sodium 2,2'-methylenebis(4,6-di-tert-butylphenyl)phosphate and potassium 2,2'-methylenebis(4,6-di-tert-butylphenyl)phosphate.

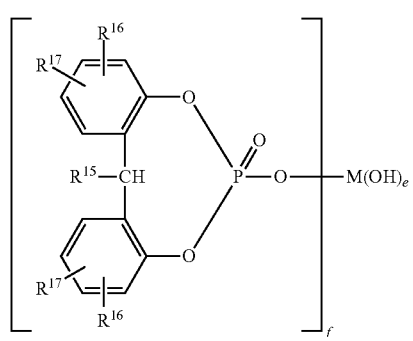

(IV)

In formula (IV), $R^{15}$ represents hydrogen atom or an alkyl group of 1-4 carbon atoms; $R^{16}$ and $R^{17}$ independently represent hydrogen atom, alkyl, cycloalkyl, aryl or aralkyl having 1-12 carbon atoms; M represents a metal group of Group 1 of the periodic table of the elements, a metal atom of Group 2, aluminum or zinc; provided that when M is a metal atom of Group 1, e and f are 0 and 1, respectively; when M is a metal atom of Group 2, f is 1 or 2 wherein when f is 1, e is 1 whereas when f is 2, e is 0; when M is aluminum, e and f are 1 and 2, respectively.

In the general formula (IV), examples of the alkyl groups having 1-4 carbon atoms represented by $R^{15}$ include methyl, ethyl, propyl, isopropyl, butyl, sec-butyl and isobutyl. Examples of the alkyl groups having 1-12 carbon atoms represented by $R^{16}$ and $R^{17}$ include methyl, ethyl, propyl, isopropyl, butyl, sec-butyl, tert-butyl, amyl, tert-amyl, hexyl, heptyl, octyl, isooctyl, tert-octyl, 2-ethylhexyl, nonyl, isononyl, decyl, isodecyl, undecyl, dodecyl and tert-dodecyl.

Examples of the metal atoms of Group 1 represented by M include lithium, sodium and potassium. Examples of the metal salts of Group 2 include magnesium, calcium, strontium and barium.

The metal salt of an automatic phosphoric acid represented by general formula (IV) is preferably a compound in which $R^{15}$ is hydrogen atom and $R^{16}$ and $R^{17}$ are tert-butyl groups, and more preferably is hydroxyaluminum-bis-(2,4,8,10-tetra-tert-butyl-6-hydroxy-12H-dibenzo(d,g)[1,3,2]-dioxaphosphocin-6-oxide).

Taking into consideration the dispersibility to propylene-based block copolymer (A), the metal salts of aromatic phosphoric acids represented by general formula (IV) may be used in combination with metal salts of carboxylic acids. The carboxylic acids for use in the metal salts of carboxylic acids are carboxylic acids other than aromatic carboxylic acids. Examples thereof include aliphatic monocarboxylic acids such as acetic acid, propionic acid, acrylic acid, octylic acid, iso octylic acid, nonanoic acid, decanoic acid, lauric acid, myristic acid, palmitic acid, stearic acid, oleic acid, ricinoleic acid, 12-hydroxystearic acid, behenic acid, montanic acid, melissic acid, β-dodecylmercaptoacetic acid, β-dodecylmercaptopropionic acid, β-N-laurylaminopropionic acid and β-N-methyl-N-lauroylaminopropionic acid; aliphatic polyhydric carboxylic acids such as malonic acid, succinic acid, adipic acid, maleic acid, azelaic acid, sebacic acid, dodecanedicarboxylic acid, citric acid, butanetricarboxylic acid and butanetetracarboxylic acid; alicyclic mono- or polyhydric carboxylic acids such as naphthenic acid, cyclopentanecarboxylic acid, 1-methylcyclopentanecarboxylic acid, 2-methylcyclopentanecarboxylic acid, cyclopentenecarboxylic acid, cyclohexanecarboxylic acid, 1-methylcyclohexanecarboxylic acid, 4-methylcyclohexanecarboxylic acid, 3,5-dimethylcyclohexanecarboxylic acid, 4-butylcyclohexanecarboxylic acid, 4-octylcyclohexanecarboxylic acid, cyclohexenecarboxylic acid and 4-cyclohexene-1,2-dicarboxylic acid.

The metal for use in the metal salts of carboxylic acids is preferably metal selected from metal atoms of Group 1 of the periodic table of the elements and metal atoms of Group 2. Examples of the metal atoms of Group 1 include lithium, sodium and potassium. Examples of the metal salts of Group 2 include magnesium, calcium, strontium and barium.

As the metal salts of carboxylic acids, ones comprising aliphatic monocarboxylic acids and metal atoms of Group 1 are typically used.

The organic nucleating agents represented by general formulas (II), (III) and (IV) can be prepared by conventional synthesis methods.

From the viewpoint of improvement in rigidity and impact resistance, the nucleating agent (B) for use in the present invention is aluminum hydroxy-di-(p-tert-butylbenzoate) and disodium bicyclo(2,2,1)heptane-2,3-dicarboxylate.

The content of nucleating agent (B) in the polypropylene resin composition of the present invention is from 0.001 to 5 parts by weight, preferably from 0.01 to 1 part by weight, and more preferably from 0.01 to 0.5 part by weight per 100 parts by weight of the propylene-based block copolymer (A). When the amount is less than 0.001 part by weight, improvement of rigidity and impact resistance may be insufficient.

When it is over 5 parts by weight, the impact resistance may fail. Moreover, the nucleating agent is too much and will only result in bad economy.

From the viewpoint of molding processability, the melt flow rate (MFR) of the polypropylene resin composition of the present invention, as measured at 230° C., is preferably from 0.1 to 400 g/10 min, more preferably from 0.5 to 300 g/10 min, and even more preferably from 1 to 200 g/10 min.

It is possible to produce the polypropylene resin composition of the present invention, for example, by melt-mixing propylene-based block copolymer (A) and from 0.001 to 5 parts by weight, based on 100 parts by weight of the block copolymer (A), of nucleating agent (B) composed of particles having an average particle diameter, as measured by the laser method, of from 0.01 to 3 μm wherein particles having particle diameters of not less than 10 μm account for less than 5% by weight, at a temperature of 180° C. or higher, and then causing the resulting molten mixture to pass through a filter.

From the viewpoint of rigidity and impact resistance of a resulting polypropylene resin composition, the filter for use in the production of the polypropylene resin composition of the present invention preferably has a filtration accuracy (width of opening) of from 30 to 200 μm, more preferably from 30 to 150 μm, and even more preferably from 40 to 110 μm.

The filtration accuracy (width of opening) of the filter is the width of spaces through which propylene-based block copolymer (A) and nucleating agent (B) can pass. The filtration accuracy is a value measured as a particle diameter (μm) of the largest glass bead which passed through a filter medium by the method provided in JIS B8356.

The material of the filter may be either metal or resin. The filter is preferably made of stainless steel, specifically SUS304, SUS316, or SUS316L.

From the viewpoint of ease of handling, the shape of the filter is a disc form (circle, semicircle, ellipse, doughnut form, polygon) or cylindrical form.

Examples of the type of the filter include woven wire mesh, crimped wire mesh, welded wire mesh, wire mesh demister, spiral wire mesh, layered metal filter and sintered metal filter. Specific examples of woven wire mesh include plain weave wire mesh, twilled weave wire mesh, satin weave wire mesh, plain weave dutch wire mesh and twilled weave dutch wire mesh. Examples of sintered metal filter include filters produced by sintering of stainless steel fiber (SUS 316L) of micron order. A desirable filter is a sintered metal filter.

In the method for the production of the polypropylene resin composition of the present invention, the weight of the molten mixture which passes through the filter per unit time per unit area of the filter is preferably 1 kg/cm²·hr or more, more preferably 2 kg/cm²·hr, and even more preferably 3.5 kg/cm²·hr.

The weight of the molten mixture which passes through the filter per unit time per unit area of the filter is typically up to 20 kg/cm²·hr.

The area of the filter is defined as the total of the surface areas of regions through which molten resin can pass. The filter may be arranged in either single stage or multiple stages, either parallel or tandem with respect to the passing direction of the resin.

From the viewpoints of impact resistance or appearance, it is desirable that the number of fish eyes occurring in the surface of a molded article (film, sheet, injection molded article, etc.) made from the polypropylene resin composition of the present invention be as small as possible. Fish eyes may be counted either visually or instrumentally, for example, with an image analyzer, a continuous fish eye counter, etc. When using the number of fish eyes with a diameter of 100 μm or more or 200 μm or more contained in a film with a thickness of 50 μm as indexes of the number fish eyes, the number of fish eyes is represented by the number of the fish eyes per unit area of the film. Regarding fish eyes with a diameter of 100 μm or more, the number of fish eyes is preferably less than 2000 fish eyes/100 cm², more preferably less than 1500 fish eyes/100 cm², and even more preferably less than 1000 fish eyes/100 cm². Regarding fish eyes with a diameter of 200 μm or more, the number of fish eyes is preferably less than 300 fish eyes/100 cm², more preferably less than 100 fish eyes/100 cm², and even more preferably less than 50 fish eyes/100 cm².

The polypropylene resin composition of the present invention may include conventional additives. Examples of such additives include neutralizing agents, antioxidants, UV absorbers, light stabilizers, antistatic agents, lubricants, antiblocking agents, processing aids, colorants, foaming agents, antibacterial agents, organic peroxides, plasticizers, flame retardants, organic peroxides, crosslinking agents, crosslinking aids and glittering materials. Such additives may be used solely or in combination. In particular, neutralizing agents, antioxidants, UV absorbers, light stabilizers and colorants are often used.

Examples of neutralizing agents include metal salts of higher fatty acids (metal soap), hydrotalcite, and oxides or hydroxides of alkaline earth metal. Such neutralizing agents are often used for neutralizing chlorine-containing compounds which are catalyst residue produced during the production of a propylene-based block copolymer (A), and they may be used singly or in combination.

Typical metal salts of higher fatty acids (metal soap) are conventionally known metal salts. As the higher fatty acid, those having from 10 to 30 carbon atoms are preferable, and those having from 12 to 18 carbon atoms are more preferable. As the metal salts, calcium salts, sodium salts, magnesium salts, lithium salts, aluminum salts and zinc salts are preferable. Calcium salts are more preferable. Metal salts often used is calcium stearate.

Hydrotalcite is a anion-exchangeable layered compound represented by the following formula (V):

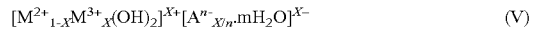

$$[M^{2+}_{1-X}M^{3+}_{X}(OH)_2]^{X+}[A^{n-}_{X/n} \cdot mH_2O]^{X-} \qquad (V)$$

In the formula, $[M^{2+}_{1-X}M^{3+}_{X}(OH)_2]^{X+}$ forms a elementary layer and $[A^{n-}_{X/n} \cdot mH_2O]^{X-}$ forms an intermediate layer. $M^{2+}$ is a divalent metal cation e.g. $Mg^{2+}$, $Mn^{2+}$, $Fe^{2+}$, $Co^{2+}$, $Ni^{2+}$, $Cu^{2+}$ and $Zn^{2+}$. $M^{3+}$ is a trivalent metal cation e.g. $Al^{3+}$, $Fe^{3+}$, $Cr^{3+}$, $Co^{3+}$ and $In^{3+}$. $A^{n-}$ is an n-valent anion e.g. $OH^-$, $F^-$, $Cl^-$, $Br^-$, $NO_3^{2-}$, $CO_3^{2-}$, $SO_4^{2-}$, $Fe(CN)_6^{3-}$, $CH_3COO^-$, oxalate ion and salicylate ion, and n is a positive integer. X satisfies $0 < X \leq 0.33$, and m is a positive number.

The hydrotalcite may be naturally occurring mineral or a synthetic product. The crystal structure, crystal particle diameter, water content, and the like may be determined appropriately. As required, surface treatment may be applied to the hydrotalcite.

Among the hydrotalcites represented by the foregoing formula, preferred is a hydrotalcite represented by the following formula (VI):

$$Mg_Y Al_2(OH)_{2Y+4} CO^3 \cdot mH_2O \qquad (VI)$$

wherein Y satisfies $Y \geq 4$ and m is a positive number.

More preferable are those wherein $M^{2+}$ in formula (VI) is constituted of one kind or two kinds of divalent cation selected from $Mg^{2+}$ and $Zn^{2+}$. Particularly preferred are the following hydrotalcites:

$Mg_{4.5}Al_2(OH)_{13}CO_3 \cdot 3H_2O$ $Mg_{4.5}Al_2(OH)_{13}(CO_3)_{0.8} \cdot O_{0.2}$ $Mg_4Al_2(OH)_{12}CO_3 \cdot 3H_2O$ $Mg_5Al_2(OH)_{14}CO_3 \cdot 4H_2O$ $Mg_6Al_2(OH)_{16}CO_3 \cdot 4H_2O$ (naturally occurring mineral)

$Zn_4Al_2(OH)_{12}CO_3 \cdot mH_2O$ (m=0-4)

$Mg_3ZnAl_2(OH)_{12}CO_3 \cdot mH_2O$ (m=0-4)

Oxides or hydroxides of alkaline earth metals are oxides or hydroxides of metal atoms of Group 2 of the periodic table, examples of which include calcium oxide, magnesium oxide, calcium hydroxide and magnesium hydroxide. Preferred is calcium hydroxide.

The amount of the neutralizing agent is, for example, from 0.001 to 0.5 part by weight, preferably from 0.005 to 0.2 part by weight, and more preferably from 0.01 to 0.2 part by weight per 100 parts by weight of propylene-based block copolymer (A)

Conventional antioxidants may be used. Antioxidants are compounds having an activity to prevent polypropylene resins from being decomposed due to heat, light, oxygen, and the like. Examples thereof include phenolic antioxidants, phosphorus-based antioxidants, sulfur-based antioxidants, hydroxylamine antioxidants, and metal deactivators.

Preferred are phenol antioxidants, phosphorus antioxidants, and sulfur antioxidants. More preferred are antioxidants comprising a combination of at least one antioxidant selected from phosphorus-based antioxidants and sulfur-based antioxidants and at least one phenolic antioxidant. Examples of specific combination include a combination of a phenolic antioxidant and a phosphorus-based antioxidant, a combination of phenolic antioxidant and a sulfur-based antioxidant, a combination of phenolic antioxidant, phosphorus-based antioxidant and sulfur-based antioxidant.

Examples of the phenol antioxidant include 2,6-di-tert-butyl-4-methylphenol, tetrakis[methylene-3(3',5'-di-tert-butyl-4-hydroxyphenyl)propionate]methane, octadecyl-3-(3,5-di-tert-butyl-4-hydroxyphenyl)propionate, 3,9-bis[2-{3-(3-tert-butyl-4-hydroxy-5-methylphenyl)propionyloxy}-1,1-dimethylethyl]-2,4,8,10-tetraoxaspiro[5.5]undecane, 1,3,5-tris-2[3-(3,5-di-tert-butyl-4-hydroxyphenyl)propionyloxy] ethyl isocyanate, 1,3,5-trimethyl-2,4,6-tris(3,5-di-tert-butyl-4-hydroxybenzyl)benzene, tris(3,5-di-tert-butyl-4-hydroxybenzyl)isocyanurate, 1,3,5-tris(4-tert-butyl-3-hydroxy-2,6-dimethylbenzyl)isocyanurate, pentaerythrityl-tetrakis[3-(3,5-di-tert-butyl-4-hydroxyphenyl)propionate], triethylene glycol-N-bis-3-(3-tert-butyl-5-methyl-4-hydroxyphenyl)propionate, 1,6-hexanediolbis[3-(3,5-di-tert-butyl-4-hydroxyphenyl)propionate], 2,2-thiobis-diethylenebis[3-(3,5-di-tert-butyl-4-hydroxyphenyl)propionate], 2,2'-methylene-bis-(4-methyl-6-tert-butylphenol), 2,2'-methylene-bis-(4-ethyl-6-tert-butylphenol), 2,2'-methylene-bis-(4,6-di-tert-butylphenol), 2,2'-ethylidene-bis-(4,6-di-tert-butylphenol), 2,2'-butylidene-bis-(4-methyl-6-tert-butylphenol), 4,4'-butylidene-bis(3-methyl-6-tert-butylphenol), 2-tert-butyl-6-(3-tert-butyl-2-hydroxy-5-methylbenzyl)-4-methylphenyl acrylate, 2,4-di-tert-amyl-6-(1-(3,5-di-tert-amyl-2-hydroxyphenyl)ethyl)phenyl acrylate and tocopherols. Examples of tocopherols include vitamin E, which is α-tocopherol.

Preferred as phenolic antioxidant are phenolic antioxidants having at least one group represented by general formula (VII) shown below:

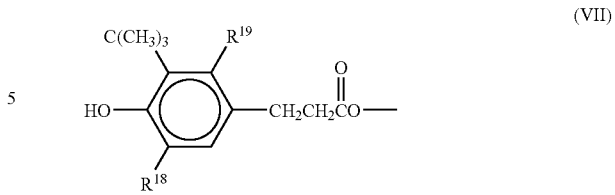

In formula (VII), $R^{18}$ and $R^{19}$ each independently represent hydrogen, methyl or tert-butyl and they may be either the same or different.

Examples of the phenolic antioxidants having at least one group represented by formula (VII) include tetrakis [methylene-3(3',5'-di-tert-butyl-4-hydroxyphenyl)propionate]methane, octadecyl-3-(3,5-di-tert-butyl-4-hydroxyphenyl)propionate, 3,9-bis[2-{3-(3-tert-butyl-4-hydroxy-5-methylphenyl)propionyloxy}-1,1-dimethylethyl]-2,4,8,10-tetraoxaspiro[5.5]undecane, triethylene glycol-N-bis-3-(3-tert-butyl-5-methyl-4-hydroxyphenyl)propionate] and 2,2-thiobis-diethylenebis[3-(3,5-di-tert-butyl-4-hydroxyphenyl)propionate].

Because a resin composition with good hue stability can be obtained, preferred is 3,9-bis[2-{3-(3-tert-butyl-4-hydroxy-5-methylphenyl)propionyloxy}-1,1-dimethylethyl]-2,4,8,10-tetraoxaspiro[5.5]undecane.

The amount of the phenolic antioxidant to be added is typically from 0.01 to 2 parts by weight, preferably from 0.01 to 1 part by weight, and more preferably from 0.01 to 0.5 part by weight per 100 parts by weight of propylene-based block copolymer.

Examples of the phosphorus-based antioxidant include tris (nonylphenyl)phosphite, tris(2,4-di-tert-butylphenyl)phosphite, distearylpentaerythritol diphosphite, bis(2,4-di-tert-butylphenyl)pentaerythritol diphosphite, bis(2,4-di-tert-butyl-6-methylphenyl)pentaerythritol diphosphite, bis(2,6-di-tert-butyl-4-methylphenyl)pentaerythritol diphosphite, bis(2,4-dicumylphenyl)pentaerythritol diphosphite, tetrakis-(2,4-di-tert-butylphenyl)4,4'-diphenylylenediphosphonite, 2,2'-methylenebis(4,6-di-tert-butylphenyl)2-ethylhexylphosphite, 2,2'-ethylidenebis(4,6-di-tert-butylphenyl)fluorophosphite, bis(2,4-di-tert-butyl-6-methylphenyl)ethylphosphite, 2-(2,4,6-tri-tert-butylphenyl)-5-ethyl-5-butyl-1,3,2-oxaphosphorinane, 2,2',2"-nitrilo[triethyl-tris(3,3',5,5'-tetra-tert-butyl-1,1'-biphenyl-2,2'-diyl)phosphite, and 2,4,8,10-tetra-tert-butyl-6-[3-(3-methyl-4-hydroxy-5-tert-butylphenyl)propoxy]dibenzo[d,f][1,3,2]dioxaphosphepine.

Because it is possible to make a resin composition have good processing stability, preferred are tris(2,4-di-tert-butylphenyl)phosphite, bis(2,4-di-tert-butylphenyl)pentaerythritol diphosphite and 2,4,8,10-tetra-tert-butyl-6-[3-(3-methyl-4-hydroxy-5-tert-butylphenyl)propoxy]dibenzo[d,f][1,3,2]dioxaphosphepine.

The amount of the phosphorus-based antioxidant to be added is typically from 0.01 to 2 parts by weight, preferably from 0.01 to 1 part by weight, and more preferably from 0.01 to 0.5 part by weight per 100 parts by weight of propylene-based block copolymer.

Examples of the sulfur-based antioxidant include: dilauryl 3,3'-thiodipropionate, tridecyl 3,3'-thiodipropionate, dimyristyl 3,3'-thiodipropionate, distearyl 3,3'-thiodipropionate, laurylstearyl 3,3'-thiodipropionate, neopentan-tetrayl tetrakis(3-laurylthiopropionate) and bis[2-methyl-4-(3-n-alkyl ($C_{12}$-$C_{14}$)thiopropionyloxy)-5-tert-butylphenyl]sulfide.

Because a resin composition with good thermally aging resistance can be obtained, preferred are 3,3'-thiodipropionate, neopentan-tetrayl tetrakis(3-laurylthiopropionate) and bis[2-methyl-4-(3-n-alkyl($C_{12}$-$C_{14}$)thiopropionyloxy)-5-tert-butylphenyl]sulfide.

The amount of the sulfur-based antioxidant to be added is typically from 0.01 to 2 parts by weight, preferably from 0.01 to 1 part by weight, and more preferably from 0.01 to 0.5 part by weight per 100 parts by weight of propylene-based block copolymer.

Examples of UV absorbers include phenyl salicylate, 4-tert-butylphenyl salicylate, 2,4-di-tert-butylphenyl 3',5'-di-tert-butyl-4'-hydroxybenzoate, myristyl 3,5-di-tert-butyl-4-hydroxybenzoate, lauryl 3,5-di-tert-butyl-4-hydroxybenzoate, palmityl 3,5-di-tert-butyl-4-hydroxybenzoate, stearyl 3,5-di-tert-butyl-4-hydroxybenzoate, behenyl 3,5-di-tert-butyl-4-hydroxybenzoate, montanyl 3,5-di-tert-butyl-4-hydroxybenzoate, 4-tert-octylphenyl salicylate, 2,4-dihydroxybenzophenone, 2-hydroxy-4-methoxybenzophenone, 2-hydroxy-4-octoxybenzophenone, 2,2'-dihydroxy-4-methoxybenzophenone, bis(5-benzoyl-4-hydroxy-2-methoxyphenyl)methane, 2,2',4,4'-tetrahydroxybenzophenone, 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-tert-octylphenyl)benzotriazole, 2-(3'-tert-butyl-2'-hydroxy-5'-methylphenyl)-5-chlorobenzotriazole, 2-(3'-sec-butyl-2'-hydroxy-5'-tert-butylphenyl)benzotriazole, 2-(2'-hydroxy-4'-octyloxyphenyl)benzotriazole, 2-(3',5'-di-tert-amyl-2'-hydroxyphenyl)benzotriazole and 2-[2'-hydroxy-3',5'-bis(α,α-dimethylbenzyl)phenyl]-2H-benzotriazole.

Because a resin composition with good hue can be obtained, preferred are 2,4-di-tert-butylphenyl 3',5'-di-tert-butyl-4'-hydroxybenzoate, lauryl 3,5-di-tert-butyl-4-hydroxybenzoate, palmityl 3,5-di-tert-butyl-4-hydroxybenzoate, stearyl 3,5-di-tert-butyl-4-hydroxybenzoate and behenyl 3,5-di-tert-butyl-4-hydroxybenzoate.

Examples of light stabilizers include bis(2,2,6,6-tetramethyl-4-piperidyl) sebacate, bis(1,2,2,6,6-pentamethyl-4-piperidyl) sebacate and 1,2,2,6,6-pentamethyl-4-piperidyl sebacate (mixture), bis(1,2,2,6,6-pentamethyl-4-piperidyl)[[3,5-bis(1,1-dimethylethyl)-4-hydroxyphenyl]methyl]butyl malonate, products resulting from a reaction between bis(2,2,6,6-tetramethyl-1(octyloxy)-4-piperidyl)decanedioate and 1,1-dimethylethyl hydroperoxide with octane, 4-benzoyloxy-2,2,6-6-tetramethylpiperidine, mixed ester prepared from 2,2,6,6-tetramethyl-4-piperidinol and a higher fatty acid, tetrakis(2,2,6,6-tetramethyl-4-piperidyl)1,2,3,4-butanetetracarboxylate, tetrakis(1,2,2,6,6-pentamethyl-4-piperidyl)1,2,3,4-butanetetracarboxylate, polycondensates of dimethyl succinate with 4-hydroxy-2,2,6,6-tetramethyl-1-piperidine ethanol, poly[{6-(1,1,3,3-tetramethylbutyl)amino-1,3,5-triazin-2,4-diyl}{(2,2,6,6-tetramethyl-4-piperidyl)imino}hexamethylene{(2,2,6,6-tetramethyl-4-piperidyl)imino}], polycondensates of dibutylamine.1,3,5-triazine.N,N'-bis(2,2,6,6-tetramethyl-4-piperidyl-1,6-hexamethylenediamine with N-(2,2,6,6-tetramethyl-4-piperidyl)butylamine, N,N',N'',N'''-tetrakis(4,6-bis(butyl-(N-methyl-2,2,6,6-tetramethylpiperidin-4-yl)amino)triazin-2-yl)-4,7-diazadecane-1,10-diamine, and mixed {1,2,2,6,6-pentamethyl-4-piperidyl/β,β,β',β'-tetramethyl-3,9-[2,4,8,10-tetraoxaspiro(5,5)undecane]diethyl}-1,2,3,4-butanetetracarboxylate.

Because a resin composition with good light stability can be obtained, preferred are bis(2,2,6,6-tetramethyl-4-piperidyl) sebacate, tetrakis(2,2,6,6-tetramethyl-4-piperidyl)1,2,3,4-butanetetracarboxylate, tetrakis(1,2,2,6,6-pentamethyl-4-piperidyl)1,2,3,4-butanetetracarboxylate, products resulting from a reaction between bis(2,2,6,6-tetramethyl-1(octyloxy)-4-piperidyl)decanedioate and 1,1-dimethylethyl hydroperoxide with octane, polycondensates of dimethyl succinate with 4-hydroxy-2,2,6,6-tetramethyl-1-piperidine ethanol, and poly[{6-(1,1,3,3-tetramethylbutyl)amino-1,3,5-triazin-2,4-diyl}{(2,2,6,6-tetramethyl-4-piperidyl)imino}hexamethylene{(2,2,6,6-tetramethyl-4-piperidyl)imino}].

The amount of the light stabilizer to be added is typically from 0.01 to 2 parts by weight, preferably from 0.01 to 1 part by weight, and more preferably from 0.01 to 0.5 part by weight per 100 parts by weight of propylene-based block copolymer.

Incorporation of the additives may be carried out by a method in which a polypropylene resin composition is prepared by mixing propylene-based block copolymer (A) and nucleating agent (B) and then the additives are further added or a method in which the additives are blended together with block copolymer (A) and nucleating agent (B) during the production of a propylene resin composition including the propylene-based block copolymer (A) and the nucleating agent (B).

The polypropylene resin composition of the present invention may include resin or rubber other than propylene-based block copolymer (A).

Examples of such resin or rubber include high density polyethylene (HDPE), low density polyethylene (LDPE), ethylene-α-olefin-based copolymers (e.g., L-LDPE and elastomer), polystyrenes (e.g. polystyrene and poly(p-methylstyrene), poly(α-methylstyrene), AS (acrylonitrile/styrene copolymer) resin, ABS (acrylonitrile/butadiene/styrene copolymer) resin, AAS (special acrylic rubber/acrylonitrile/styrene copolymer) resin, ACS (acrylonitrile/chlorinated polyethylene/styrene copolymer) resin, polychloroprene, chlorinated rubber, polyvinyl chloride, polyvinylidene chloride, acrylic resin, ethylene/vinyl alcohol copolymer resin, fluororesin, polyacetal, grafted polyphenylene ether resin, grafted polyphenylene sulfide resin, polyurethane, polyamide, polyester resin (e.g. polyethylene terephthalate and polybutylene terephthalate), polycarbonate, polysulfone, polyether ether ketone, polyether sulfone and aromatic polyester resin; epoxy resin, diallyphthalateprepolymer, silicone resin, silicone rubber, polybutadiene, 1,2-polybutadiene, polyisoprene, styrene/butadiene copolymer, butadiene/acrylonitrile copolymer, epichlorohydrin rubber, acrylic rubber and natural rubber.

As such additional resin or rubber, low density polyethylene (LDPE) and elastomer composed of an ethylene-α-olefin-based copolymer are typically used. Examples of the elastomer composed of an ethylene-α-olefin-based copolymer include elastomers composed of an ethylene-butene-1 copolymer, an ethylene-hexene-1 copolymer or an ethylene-octene-1 copolymer. Elastomers prepared by use of a homogeneous catalyst typified by metallocene catalysts are employed. These additional resins may be used solely or in combination.

The content of α-olefin included in these copolymers is typically from 5 to 50% by weight and the MFR of the ethylene-α-olefin elastomer, as measured at 190° C., is typically from 0.05 to 50 g/10 min.

Resin, rubber, etc. other than the propylene-based block copolymer may be compounded, for example, by a method in which they are blended to pellets of the polypropylene resin composition which has been melt kneaded in advance, or by a method in which they are compounded, in the process of producing the polypropylene resin composition, together with propylene-based block copolymer (A), nucleating agent (B) and additives to be added if needed.

The polypropylene resin composition of the present invention may include filler.

Examples of filler include talc, clay, mica, glass fiber, glass balloon, glass beads, calcium silicate, bentonite, silica, diatomaceous earth, alumina, titanium oxide, iron oxide, zinc oxide, magnesium oxide, ferrite, alumina fiber, aluminum hydroxide, magnesium hydroxide, basic magnesium carbonate, calcium carbonate, magnesium carbonate, dolomite, dawsonite, calcium sulfate, barium sulfate, ammonium sulfate, calcium sulfite, carbon black, graphite, carbon fiber, carbon hollow sphere, metal powder, molybdenum sulfide, boron fiber, silicon carbide fiber, metal fiber, potassium titanate, synthetic organic fiber, natural fiber and wood flour.

The filler may be added, for example, by a method in which the filler is added to pellets of a polypropylene resin composition which has been melt kneaded in advance, or by a method in which the filler is compounded, in the process of producing the polypropylene resin composition, together with propylene-based block copolymer (A), nucleating agent (B) and additives to be added if needed.

Colorants which are conventionally used are available, such as inorganic pigments and organic pigments. Examples of inorganic pigments include iron oxide, titanium oxide, zinc oxide, which are used also as filler, burnt ocher, cadmium red, cadmium yellow, permanent blue, cobalt blue, titanium yellow, white lead, red lead, lead yellow and Berlin blue. Examples of organic pigments include quinacridon, polyazo yellow, anthraquinon yellow, polyazo red, azo lake yellow, perylene, phthalocyanine green, phthalocyanine blue and isoindolinone yellow. These colorants may use solely or in combination.

The polypropylene resin composition of the present invention and additives, additional resin, rubber or filler added to the resin composition may be melt-kneaded together by a conventional method at a temperature of 180° C. or higher, preferably from 180 to 300° C., and more preferably from 180 to 250° C. The melt-kneading may be carried out by use of a melt extruder, a Banbury mixer, or the like.

Nucleating agent (B) may be combined with propylene-based block copolymer (A), for example, by use of a high concentration masterbatch of the nucleating agent (B), which includes the nucleating agent (B) at a concentration of from 1 to 90% by weight, or a high concentration granules composed of nucleating agent (B) and at least one additive, which granules include the nucleating agent (B) at a concentration of from 10 to 90% by weight. The high concentration masterbatch is prepared by melt-kneading of propylene-based block copolymer (A) with nucleating agent (B). The granules are prepared by mixing nucleating agent (B) with at least one additive, followed by shaping the blend into granular shape. The high concentration masterbach or the high concentration granules thus-prepared in advance are diluted and combined with propylene-based block copolymer (A).

In the preparation of the polypropylene resin composition, conventional melt-kneading machines may be used. Example of such melt-kneading machines include a single screw extruder, a co-rotating twin screw extruder (e.g., ZSK® of Wernw Pfleideren, TEM® of Toshiba Machine Co., Ltd., TEX® of The Japan Steel Works, Ltd.) and a counter-rotating twin screw extruder (e.g., CMP® and TEX® of The Japan Steel Works, Ltd., FCM®, NCM®, LCM® of Kobe Steel, Ltd.).

The polypropylene resin composition of the present invention may, for example, be in strand form, sheet form, flat plate form, or pellet form obtained by cutting a strand into a desired length. In order to make the polypropylene resin composition of the present invention applicable to molding, it is preferable to shape the resin composition into pellets having a length of from 1 to 50 mm in view of the production stability of formed articles.

The formed article of the present invention is a product obtained by forming the polypropylene resin composition of the present invention by a method selected from various kinds of forming methods. The shape, size and the like may be determined appropriately.

Examples of the method for producing the formed article of the present invention include injection molding, press molding, vacuum forming, foam molding and extrusion forming, which are usually used in industry. Depending upon purposes, a forming method in which the polypropylene resin composition of the present invention and a similar type of polyolefin resin or other resin are laminated, a co-extrusion forming, and the like may be employed.

The molded article of the present invention is preferably an injection molded article produced by injection molding. The injection molding includes, in addition to typical injection molding, injection foam molding, supercritical injection foam molding, ultrahigh speed injection molding, injection compression molding, gas-assist injection molding, sandwich molding, sandwich foam molding and insert/outsert molding.

Examples of the applications of the formed article of the present invention include automotive components, home electrical components, OA equipment components, building materials, medical materials, drain pans, toiletry supplies, bottles, containers, sheet and film.

Examples of the automotive components include interior components such as door trims, pillars, instrument panels, consoles, locker panels, arm rests, door panels and spare tire cover; exterior components such as bumpers, spoilers, fenders and side steps; other components such as air-intake ducts, coolant reserve tanks, fender liners, fans and underdeflectors; and integrated components such as front end panels.

A drain pan may be a waterproof pan in a washroom or bathroom or that for washing machines. Examples of toiletry materials include toilet seats, toilet lids, inner cisterns, outer cisterns and paper holders.

Examples of household electric appliances include components of clothes washers (outer tank, inner tank, pulsator, balancer, etc.), drying machine components, vacuum cleaner components, rice cooker components, electric pot components, heat insulator components, dish washer components and air cleaner components.

Examples of OA equipment/media-related supplies include cases of magnetic recording mediums and optical recording mediums, parts of personal computers, parts of printers, and tanks for preservation of ink.

Examples of medical materials include infusion solution bags and injection syringes. Bottles may be ones for containing foods, beverage, detergent, etc. Containers include containers for food packaging, transport containers, clothes containers, and containers for stationery.

Sheet may be sheet for stationery and sundries. Film may be oriented film, non-oriented film, blown film, etc. for use in various types of wrapping or packaging.

Preferable applications include automotive components, home electric components, medical materials, drain pans, toiletry materials and containers.

EXAMPLES

The present invention will be explained below with reference to examples and comparative examples. The propylene-based copolymers and additives used in the examples and comparative examples are listed below.

(1) Propylene-Based Block Copolymer (Component (A))

Propylene-based block copolymers (A-1) through (A-4) were prepared by liquid phase-vapor phase polymerization or vapor phase polymerization under conditions such that propylene-block copolymers with physical properties shown below could be produced using a catalyst prepared by the method disclosed in Example 1 of JP2004-182981 A for (A-1) to (A-3) and a catalyst prepared by the method disclosed in Example 5 of JP 7-216017 A for (A-4)

(A-1) Propylene-(Propylene-Ethylene) Block Copolymer
MFR (at 230° C.) of the block copolymer: 38 g/10 min
Ethylene content of the block copolymer: 9.9% by weight
Intrinsic viscosity ($[\eta]_{total}$) of the block copolymer: 1.38 dl/g $[\eta]_{II}/[\eta]_{I}$=3.09

Polymer component (I): propylene homopolymer component
Isotactic pentad fraction of polymer component (I): 0.983
Intrinsic viscosity ($[\eta]_I$) of polymer component (I): 0.90 dl/g
20° C. xylene-soluble component in polymer component (I) ($CXS_{(I)}$): 0.39% by weight Polymer component (II): propylene-ethylene copolymer component
Content of polymer component (II): 25.5% by weight
Ethylene content of polymer component (II): 38.8% by weight
Intrinsic viscosity ($[\eta]_{II}$) of polymer component (II): 2.78 dl/g (A-2) Propylene-(Propylene-Ethylene) Block Copolymer
MFR (at 230° C.) of the block copolymer: 35 g/10 min
Ethylene content of the block copolymer: 8.2% by weight
Intrinsic viscosity ($[\eta]_{total}$) of the block copolymer: 1.42 dl/g $[\eta]_{II}/[\eta]_{I}$=3.35

Polymer component (I): propylene homopolymer component
Isotactic pentad fraction of polymer component (I): 0.985
Intrinsic viscosity ($[\eta]_I$) of polymer component (I): 0.97 dl/g
20° C. xylene-soluble component in polymer component (I) ($CXS_{(I)}$): 0.31% by weight Polymer component (II): propylene-ethylene copolymer component
Content of polymer component (II): 20.0% by weight
Ethylene content of polymer component (II): 41.1% by weight
Intrinsic viscosity ($[\eta]_{II}$) of polymer component (II): 3.25 dl/g (A-3) Propylene-(Propylene-Ethylene) Block Copolymer
MFR (at 230° C.) of the block copolymer: 27 g/10 min
Ethylene content of the block copolymer: 7.3% by weight
Intrinsic viscosity ($[\eta]_{total}$) of the block copolymer: 1.48 dl/g $[\eta]_{II}/[\eta]_{I}$=4.09

Polymer component (I): propylene homopolymer component
Isotactic pentad fraction of polymer component (I): 0.985
Intrinsic viscosity ($[\eta]_I$) of polymer component (I): 0.99 dl/g
20° C. xylene-soluble component in polymer component (I) ($CXS_{(I)}$): 0.30% by weight Polymer component (II): propylene-ethylene copolymer component
Content of polymer component (II): 16.9% by weight
Ethylene content of polymer component (II): 43.2% by weight
Intrinsic viscosity ($[\eta]_{II}$) of polymer component (II): 4.05 dl/g (A-4) Propylene-(Propylene-Ethylene) Block Copolymer
MFR (at 230° C.) of the block copolymer: 26 g/10 min
Ethylene content of the block copolymer: 7.4% by weight
Intrinsic viscosity ($[\eta]_{total}$) of the block copolymer: 1.40 dl/g $[\eta]_{II}/[\eta]_{I}$=2.52

Polymer component (I): propylene homopolymer component
Isotactic pentad fraction of polymer component (I): 0.970
Intrinsic viscosity ($[\eta]_I$) of polymer component (I): 1.07 dl/g
20° C. xylene-soluble component in polymer component (I) ($CXS_{(I)}$): 0.75% by weight Polymer component (II): propylene-ethylene copolymer component
Content of polymer component (II): 20.0% by weight
Ethylene content of polymer component (II): 37% by weight
Intrinsic viscosity ($[\eta]_{II}$) of polymer component (II): 2.7 dl/g (2) Nucleating Agent (Component (B))

(B-1) AL-PTBBA (Manufactured By Kyodo Yakuhin Co., Ltd.)
Chemical name: aluminum hydroxy-di-(p-tert-butylbenzoate)
Average particle diameter: 1.5 μm
The amount of particles having particle diameters of 15 μm or more: 0% by weight (not found)
The amount of particles having particle diameters of 10 μm or more: 0% by weight (not found)
(The particle diameter was measured by a laser diffraction particle size distribution analyzer "HELOS" available from Sympatec GmbH.)

(B-2) Hyperform HPN-68L (Manufactured By Milliken Japan KK.)
Chemical name: disodium (1R,2R,3S,4S)-bicyclo[2.2.1]heptane-2,3-dicarboxylate (purity: 80% by weight)
Average particle diameter: 1.8 μm
The amount of particles having particle diameters of 15 μm or more: 0% by weight (not found)
The amount of particles having particle diameters of 10 μm or more: 0.5% by weight
(The particle diameter was measured by a laser diffraction particle size distribution analyzer "HELOS" available from Sympatec GmbH.)

(B-3) Talc (Manufactured By Hayashi Kasei Co., Ltd.)
Chemical name: hydrous magnesium silicate ($4SiO_2.3MgO.H_2O$)
Average particle diameter: 8 μm
The amount of particles having particle diameters of 15 μm or more: 28% by weight
The amount of particles having particle diameters of 10 μm or more: 42% by weight
(The particle diameter was measured by a laser diffraction particle size distribution analyzer "HELOS" available from Sympatec GmbH.)

(B-4) Sodium Benzoate 20M (Manufactured By Ciba Specialty Chemicals)
Chemical name: sodium benzoate
Average particle diameter: 3.6 μm The amount of particles having particle diameters of 15 μm or more: 3% by weight The amount of particles having particle diameters of 10 μm or more: 10% by weight (3) Additive (Component C)

(C-1) Calcium Stearate: Manufactured By Kyodo Yakuhin Co., Ltd.

(C-2) Sumilizer GA80: Manufactured By Sumitomo Chemical Co., Ltd.

Chemical name:

> 3,9-bis[2-(3-(3-tert-butyl-4-hydroxy-5-methylphenyl)propion yloxy)-1,1-dimethylethyl]-2,4,8,10-tetraoxaspiro[5.5]undecane (C-3) ADK STAB PEP-24G: manufactured by Asahi Denka Co., Ltd.

Chemical name:

> bis(2,4-di-tert-butylphenyl)pentaerythritol diphosphite (4) Filter

Filter A: Finepore NF15N (sintered metal wire mesh filter manufactured by Nippon Seisen Co., Ltd.), filtration accuracy: 100 μm Filter B: Finepore NF13D (sintered metal wire mesh filter manufactured by Nippon Seisen Co., Ltd.), filtration accuracy: 60 μm Filter C: 50 mesh (woven wire mesh filter) filtration accuracy: 410 μm Physical properties of propylene-based block copolymer (A) and polypropylene resin compositions were measured according to the following methods.

(1) Melt Flow Rate (MFR, Unit: g/10 Minutes)

The melt flow rate was measured according to the method provided in JIS K6758. The measurement was carried out at a temperature of 230° C. and a load of 2.16 kg.

(2) Intrinsic Viscosity ($[\eta]$, Unit: dl/g)

Reduced viscosities were measured at three concentrations of 0.1, 0.2 and 0.5 g/dl using a Ubbelohde's viscometer. The intrinsic viscosity was calculated by a calculation method described in "Kobunshi Yoeki (Polymer Solution), Kobunshi Jikkengaku (Polymer Experiment Study) vol. 11" page 491 (published by Kyoritsu Shuppan Co., Ltd., 1982), namely, by an extrapolation method in which reduced viscosities are plotted against concentrations and the concentration is extrapolated in zero. The measurements were carried out at 135° C. using Tetralin as a solvent. A polymer powder collected from a polymerization reactor was used as a sample. In the case of polymer component (I), a polymer powder partly collected from the polymerization reactor of the first stage was subjected to the measurement and the intrinsic viscosity thereof was used as $[\eta]_I$.

(3) Measurement and Calculation of Ratios and Intrinsic Viscosities ($[\eta]_{Total}$, $[\eta]_I$ and $[\eta]_{II}$) of Polymer Components (I) and (II)

The intrinsic viscosity $[\eta]_{II}$ of polymer component (II) produced in the step of the second stage was calculated according to the following formula on the basis of the intrinsic viscosity $[\eta]_I$ of polymer component (I) produced in the polymerization step of the first stage, the intrinsic viscosity $[\eta]_{Total}$, determined by the method of (2) disclosed above, of the final polymer resulting from the polymerization step of the second stage, namely the combination of the components (I) and (II), and the content (weight ratio) of the polymer component (II) in the final polymer.

$$[\eta]_{II}=([\eta]_{Total}-[\eta]_I \times X_I)/X_{II}$$

$[\eta]_{Total}$: the intrinsic viscosity (dl/g) of the final polymer after the second polymerization step $[\eta]_I$: the intrinsic viscosity (dl/g) of the sample taken out from a polymerization reactor after the first polymerization step $X_I$: the weight ratio of the component produced in the polymerization in the first step $X_{II}$: the weight ratio of the component produced in the polymerization in the second step $X_I$ and $X_{II}$ were determined on the basis of the material balance during the polymerizations.

(4) Calculation of the Content (Unit: % By Weight) of the Propylene-Ethylene Copolymer Component (II) of a Propylene-(Propylene-Ethylene) Block Copolymer and the Ethylene Content (Unit: % By Weight) in the Propylene-Ethylene Copolymer Component (II)

The contents were determined from $^{13}$C-NMR spectrum measured under the following conditions based on the report by Kakugo et al., (Macromolecules 1982, 15, 1150-1152).

A sample was prepared by homogeneously dissolving about 200 mg of a propylene-(propylene-ethylene) block copolymer in 3 ml of a mixed solvent (orthodichlorobenzene/deuterated orthochlorobenzene=4/1 (volume ratio)) in a 10-mmφ test tube. Then, the $^{13}$C-NMR spectrum of the sample was measured under the following conditions. Measurement was carried out by use of JNM-EX270 available from JEOL Ltd.

Measuring temperature: 135° C.

Pulse repeating time: 10 seconds

Pulse width: 45°

The number of integration: 2500

(5) Isotactic Pentad Fraction (mmmm Fraction)

An isotactic pentad fraction was determined for the propylene hompolymer component, which is the powder sampled from the polymerization reactor of the first stage.

The isotactic pentad fraction, which is a measure of stereoregularity, is the fraction of propylene monomer unit existing at the center of the isotactic chain in the form of a pentad unit, in other words, the chain in which five propylene monomer units are successively meso-bonded, in the polypropylene molecular chain as measured by the method disclosed by A. Zambelli et al. in Macromolecules, 6, 925 (1973), namely by use of $^{13}$C-NMR. The assignment of NMR absorption peaks was determined according to the method described in Macromolecules, 8, 687 (1975). Specifically, the isotactic pentad fraction was measured as an area fraction of mmmm peak in the total absorption peak in the methyl carbon region of $^{13}$C-NMR spectrum. The measurement was carried out by use of AM400 available from BRUKER.

(6) Content of 20° C. Xylene-Soluble Component (Unit: % By Weight)

Five grams of polymer component (I) was dissolved completely in 500 ml of boiling xylene, then cooled to 20° C. and left to stand for four hours. The mixture was then filtered so that the matter insoluble in 20° C. was removed. The filtrate was concentrated by evaporation of xylene, followed by drying at 60° C. under reduced pressure. Thus, a 20° C. xylene-soluble component was obtained. The dry weight of the 20° C. xylene-soluble component was measured, and, in accordance with the following formula, the content of the 20° C. xylene-soluble component ($CXS_{(I)}$: % by weight) was calculated.

$CXS_{(I)}$=(dry weight of 20° C. xylene-soluble component/ weight of polymer component (I) charged)×100

(7) Flexural Modulus (Unit: MPa)

The flexural modulus was measured according to the method provided in JIS K7203. The measurement was carried out at a load speed of 2.5 mm/min and a measuring temperature of 23° C. using an injection-molded specimen having a thickness of 6.4 mm and a span length of 100 mm.

(8) Tensile Strength

Tensile strength was measured according to the method provided in ASTM D638. The measurement was carried out by using injection-molded specimens 3.2 mm in thickness. The yield strength (unit: MPa) was measured at a tensile speed of 50 mm/min. The measurement was carried out at a temperature of 23° C.

(9) Izod Impact Strength (Unit: $kJ/m^2$)

The measurement was carried out according to the method provided in JIS K 7110. The measurement was conducted at a measurement temperature of −20° C. using a notched specimen with a thickness of 6.4 mm which was formed by injection molding, followed by notching.

(10) Impact Strength (Drop Weight Impact Strength: FWI) (Unit: J)

The impact energy at which 50% in number of the specimens tested ruptured was determined by the method provided in JIS K7211 except using an iron weight having the shape shown in FIG. 1. The measurement temperature was −20° C.

Injection molded specimens were used. Specifically, several long plates with dimensions MD×TD×thickness=400× 100×3 mm were molded. Each of the plates was divided into five equal parts along the TD direction (that is, each divided part was a long plate with dimensions MD×TD=80×100 mm). Central three of the five parts were used as specimens for test.

(11) Heat Distortion Temperature (HDT, Unit: ° C.)

The heat distortion temperature was measured according to the method provided in JIS K7207. It was measured at a fiber stress of 4.6 $kg/cm^2$.

(Preparation of Injection Molded Articles)

Specimens (injection molded articles) for evaluations of the above-mentioned physical properties and drop weight strength were prepared according to the following methods.

(1) Preparation of Specimen for Evaluation of Mechanical Properties

A specimen for evaluation of mechanical properties was prepared by injection molding using an injection molding machine NEOMAT 350/120 manufactured by Sumitomo Heavy Industries, Ltd. at a molding temperature of 220° C. and a mold cooling temperature of 50° C.

(2) Preparation of Specimen for Evaluation of Drop Weight Impact Strength

A specimen with dimensions MD×TD×thickness=400× 100×3 mm for evaluation of drop weight impact strength was prepared by injection molding using an injection molding machine NEOMAT 515/150 manufactured by Sumitomo Heavy Industries, Ltd. at a molding temperature of 220° C. and a mold cooling temperature of 50° C.

(12) Fish Eye (Fish Eyes/100 $cm^2$)

A film prepared under conditions shown below using a single screw extruder with a T-die was subjected to a quantitative analysis according to a method given below using an image analyzer.

[Film Preparation Conditions]

A film with a width of 50 mm and a thickness of 50 µm was prepared using a single screw extruder V-20 manufactured by Tanabe Plastic Machine Co., Ltd. and a haul-off machine.

[Quantitative Analysis Method]

Images (900 dpi, 8 bit) of a film were captured into a computer by a scanner GT-9600 manufactured by EPSON, and the images were binarized by image analysis software "A zo-kun" available from Asahi Engineering Co., Ltd. Fish eyes were recognized as parts brighter than surrounding areas. Because the fish eyes had irregular forms, the diameter of a circle having an area the same as that of a fish eye was used as the size of the fish eye, and the number of fish eyes having a diameter of 100 µm or more or 200 µm or more per 100 $cm^2$ of the film was counted.

Example 1

[Preparation of Propylene-Based Block Copolymer (A-1)]

After a SUS loop-type reactor having a capacity of 0.36 $m^3$ for liquid phase polymerization was purged fully with propylene, 0.105 mol/hr of triethylaluminium and 0.0057 mol/hr of tert-butyl-n-propyl-dimethoxysilane were fed. Then, the inner temperature was adjusted to 45-55° C. and the pressure was adjusted to 3.3-3.4 MPa with propylene and hydrogen, followed by continuous feeding of 0.040-0.050 kg/hr of solid catalyst component, which had been prepared by the method disclosed in Example 1 of JP2004-182981A. Thus, polymerization was started. The polymer produced in the loop-type reactor for liquid phase polymerization was transferred to a vapor phase polymerization reactor. The vapor phase polymerization reactor included three reactors. In a first reactor (capacity: 45.75 $m^3$), production of a propylene homopolymer component by vapor phase polymerization was continued by continuously feeding propylene so as to keep the reaction temperature at 70° C. and the reaction pressure at 1.9 MPa and feeding hydrogen so as to keep the hydrogen concentration in the vapor phase at 17.5-18.5 vol %. Subsequently, the propylene homopolymer component produced in the first reactor was introduced into a second reactor intermittently. In the second reactor (capacity: 22.68 $m^3$), a propylene homopolymer component (hereinafter, referred to as polymer component (I)) was produced by continuing vapor phase polymerization while continuously feeding propylene so as to keep the reaction temperature at 70° C. and the reaction pressure at 1.5 MPa and feeding hydrogen so as to keep the hydrogen concentration in the vapor phase at 17.5- 18.5 vol %. Subsequently, the propylene homopolymer component produced in the second reactor (polymer component (I)) was introduced into a third reactor intermittently. In the third reactor (capacity: 40.59 $m^3$), vapor phase polymerization for producing a propylene-ethylene copolymer component (hereinafter, referred to as polymer component (II)) was continued by continuously feeding propylene so as to keep the reaction temperature at 70° C. and the reaction pressure at 1.1 MPa, feeding hydrogen so as to keep the hydrogen concentration in the vapor phase at 2.5-3.5 vol % and feeding ethylene so as to keep the ethylene concentration in the vapor phase at 24-25 vol %. Subsequently, a powder composed of polymer component (I) and polymer component (II) in the reactor (third reactor) was introduced into a deactivation vessel intermittently and the catalyst component was deactivated with water. Then, the powder was dried in nitrogen at 80° C. to yield a white powder (A-1) composed of propylene-(propylene-ethylene) block copolymer.

The polymer component (I) produced in the second reactor was sampled in a small amount and was analyzed. The analysis revealed that the polymer component (I) had an intrinsic viscosity $[\eta]_I$ of 0.90 dl/g, an isotactic pentad fraction (mmmm fraction) of 0.983 and a content of 20° C. xylene-soluble component ($CXS_{(I)}$) of 0.39% by weight. The whole portion of the resulting propylene-(propylene-ethylene) block copolymer had an intrinsic viscosity ($[\eta]_{Total}$) of 1.38 dl/g, an MFR of 38 g/10 min and an ethylene content of 9.9% by weight. In addition, the weight ratio of the propylene homopolymer component (polymer component (I)) to the propylene-ethylene copolymer component (polymer component (II)) was 74.5/25.5, which was calculated based on the weight of the resulting propylene-(propylene-ethylene) block copolymer and the weight of the propylene homopolymer component (polymer component (I)). Therefore, the ethylene content in the propylene-ethylene copolymer component (polymer component (II)) was 38.8% by weight and the intrinsic viscosity ($[\eta]_{II}$) of polymer component (II) was 2.78 dl/g.

[Pelletization (Melt-Kneading, Filtration)]

To 100 parts by weight of a powder of the propylene-(propylene-ethylene) block copolymer, additives (C-1, C-2, C-3) each in 0.05 parts by weight were added together with a nucleating agent, namely 0.1 parts by weight of aluminum hydroxy-di-(p-tert-butylbenzoate) particles (B-1) which had an average particle diameter of 1.5 μm and included no particles having diameters not smaller than 10 μm. They were mixed in a tumbler to yield a mixture. The mixture was melt-kneaded in a single screw extruder with an inner diameter of 40 mm (manufactured by Tanabe Plastic Machine Co.) equipped with a die having therein a sintered metal filter (NF15N, hereinafter referred to as Filter A; size of opening (filtration accuracy)=100 μm, round-shaped, area=14.5 $cm^2$) at a set temperature of 220° C., a screw rotation speed of 100 rpm and an extrusion rate of 16 kg/hr. The mixture was filtered and then extruded. The extrudate was cooled in water to solidify, and then cut to yield pellets of a propylene-based resin composition. Under the above-mentioned conditions, the weight of the melt-kneaded propylene-based resin composition passing through the metal filter per unit time and unit area of the metal filter was 1.1 kg/$cm^2$·hr. Thus, the extrusion performance was stable. Using the resulting pellets, specimens for evaluations of physical properties were prepared in the ways previously described by means of an injection molding machine.

The specimens were conditioned and then measured for physical properties. The evaluation results are shown in Table 1. The results are shown in Table 1.

Comparative Example 1

The operations were carried out in the same manner as in Example 1 except adding no nucleating agent (B-1). The results are shown in Table 1.

Example 2

The operations were carried out in the same manner as in Example 1 except changing the Filter A to Filter B. The results are shown in Table 2.

Example 3

The operations were carried out in the same manner as in Example 1 except changing the nucleating agent (B-1) to (B-2) The results are shown in Table 2.

Comparative Example 2

The operations were carried out in the same manner as in Example 2 except changing the nucleating agent (B-1) to (B-3). The results are shown in Table 2.

TABLE 1

| | | Unit | Example 1 | Comparative Example 1 |
|---|---|---|---|---|
| Composition | Component A | part by weight | A-1 100 | A-1 100 |
| | Component B | part by weight | B-1 0.1 | Not added |
| Melt-kneading conditions | Extrusion capacity | kg/hr | 16 | 16 |
| | Filter | Type | Filter A | Filter A |
| | | Filtration accuracy μm | 100 | 100 |
| Mechanical properties of molded article | MFR | g/10 min | 38 | 37 |
| | Tensile yield strength | MPa | 21 | 20 |
| | Flexural modulus | MPa | 1060 | 890 |
| | Flexural strength | MPa | 26 | 23 |
| | Izod impact strength (−20° C.) | kJ/$m^2$ | 6.2 | 6.2 |
| | FWI (−20° C.) | J | 33 | 28 |
| | HDT | ° C. | 116 | 103 |

[Common composition]
Component C: C-1/C-2/C-3: 0.05/0.05/0.05 (part by weight)

TABLE 2

| | | Unit | Example 2 | Example 3 | Comparative Example 2 |
|---|---|---|---|---|---|
| Composition | Component A | part by weight | A-1 100 | A-1 100 | A-1 100 |
| | Component B | part by weight | B-1 0.1 | B-2 0.1 | B-3 0.1 |
| Melt-kneading conditions | Extrusion capacity | kg/hr | 16 | 16 | 16 |
| | Filter | Type | Filter B | Filter B | Filter B |
| | | Filtration accuracy μm | 60 | 60 | 60 |
| Mechanical properties of molded article | MFR | g/10 min | 37 | 38 | 39 |
| | Tensile yield strength | MPa | 21 | 21 | 21 |
| | Flexural modulus | MPa | 1040 | 1030 | 960 |
| | Flexural strength | MPa | 25 | 26 | 25 |
| | Izod impact strength (−20° C.) | kJ/$m^2$ | 6.3 | 6.9 | 6.3 |
| | FWI (−20° C.) | J | 36 | 38 | 36 |
| | HDT | ° C. | 114 | 115 | 109 |

Example 4

The operations were carried out in the same manner as in Example 1 except changing the propylene-block copolymer (A-1) to (A-2) and changing the Filter A to Filter B. The results are shown in Table 3. The propylene-based block copolymer (A-2) was prepared by a method similar to the method described in Example 1 wherein polymerization conditions were adjusted so that properties of (A-2) were obtained.

Example 5

The operations were carried out in the same manner as in Example 3 except changing the nucleating agent (B-1) to (B-2) The results are shown in Table 3.

Comparative Example 3

The operations were carried out in the same manner as in Example 3 except changing the nucleating agent (B-1) to (B-3) The results are shown in Table 3.

Comparative Example 4

The operations were carried out in the same manner as in Example 3 except changing the nucleating agent (B-1) to (B-4) The results are shown in Table 3.

Comparative Example 5

The operations were carried out in the same manner as in Example 4 except changing the propylene-block copolymer (A-2) to (A-4) and changing the Filter B to Filter C. The results are shown in Table 3. The preparation of the propylene-based block copolymer (A-4) was carried out in the following way.

[Preparation of Propylene-Based Block Copolymer (A-4)]
[Prepolymerization]

Into a jacketed SUS reactor with a capacity of 3 m$^3$, n-hexane which had been degassed and dewatered, solid catalyst component (A) which had been prepared by the method disclosed in Example 5 of JP 7-216017 A, cyclohexylethyldimethoxysilane (B) and triethylaluminium (C) were introduced so that C/A=1.67 mmol/g and B/C=0.13 mmol/mmol. Thus, a prepolymerization catalyst component was prepared so that the degree of prepolymerization with propylene became 3.5 (gram-prepolymer/gram-solid catalyst component (A)).

[Main Polymerization]

In a jacketed SUS reactor (first reactor) with a capacity of 248 m$^3$, vapor phase polymerization for producing a powdery propylene homopolymer component (hereinafter, referred to as polymer component (I)) was carried out continuously while the prepolymerization catalyst component prepared in the aforementioned prepolymerization and propylene were fed continuously under conditions where the reaction temperature and the reaction pressure were kept at 83° C. and 2.1 MPa, respectively, and hydrogen was fed so as to keep the hydrogen concentration in the vapor phase at 3.7%. Subsequently, some part of the polymer component (I) was transferred intermittently into a jacketed SUS reactor (second reactor) with a capacity of 115 m$^3$. Production of polymer component (I) by vapor phase polymerization was continued by feeding propylene continuously under conditions where the reaction temperature and the reaction pressure were kept at 83° C. and 1.7 MPa, respectively, and hydrogen was fed so as to keep the hydrogen concentration in the vapor phase at 3.6 vol %. The polymer component (I) produced by the polymerization in the second reactor was sampled and analyzed. The analysis revealed that it had an intrinsic viscosity $[\eta]_I$ of 1.07 dl/g, an isotactic pentad fraction (mmmm fraction) of 0.970, and a content of 20° C. xylene-soluble component (CXS$_{(I)}$) of 0.39% by weight.

Subsequently, a part of the polymer component (I) produced in the second reactor was transferred to a jacketed SUS reactor (third reactor) with a capacity of 219 m$^3$ and then production of a ethylene-propylene copolymer component (hereinafter, referred to as polymer component (II)) by polymerization of propylene and ethylene was started. The vapor phase polymerization for producing polymer component (II) was continued while propylene and ethylene were fed continuously at a weight proportion of propylene/ethylene=2/1 so that the reaction pressure was kept at 1.3 MPa at a reaction temperature of 70° C. and the hydrogen concentration in the vapor phase was adjusted so as to be kept at 2.3 vol %.

Subsequently, a powder composed of polymer component (I) and polymer component (II) in the reactor (third reactor) was introduced into a deactivation vessel intermittently and the catalyst component was deactivated with water. Then, the powder was dried in nitrogen at 65° C. to yield a white powder composed of propylene-(propylene-ethylene) block copolymer.

The whole portion of the resulting propylene-(propylene-ethylene) block copolymer had an intrinsic viscosity $[\eta]_{Total}$ of 1.40 dl/g and an ethylene content of 7.4% by weight. In addition, the weight ratio of the propylene homopolymer component (polymer component (I)) to the propylene-ethylene copolymer component (polymer component (II)) was 80/20, which was calculated based on the weight of the resulting propylene-(propylene-ethylene) block copolymer and the weight of the propylene homopolymer component (polymer component (I)). Therefore, the ethylene content in the propylene-ethylene copolymer component (polymer component (II)) was 37% by weight and the intrinsic viscosity ($[\eta]_{II}$) of the propylene-ethylene copolymer component (polymer component (II)) was 2.7 dl/g.

TABLE 3

| | | Unit | Example 4 | Example 5 | Comparative Example 3 | Comparative Example 4 | Comparative Example 5 |
|---|---|---|---|---|---|---|---|
| Composition | Component A | part by weight | A-2 | A-2 | A-2 | A-2 | A-4 |
| | | | 100 | 100 | 100 | 100 | 100 |
| | Component B | part by weight | B-1 | B-2 | B-3 | B-4 | B-1 |
| | | | 0.1 | 0.1 | 0.1 | 0.1 | 0.1 |
| Melt-kneading conditions | Extrusion capacity | kg/hr | 16 | 16 | 16 | 16 | 16 |
| | Filter | Type | Filter B | Filter B | Filter B | Filter B | Filter C |
| | | Filtration accuracy μm | 60 | 60 | 60 | 60 | 410 |
| Mechanical properties of molded article | MFR | g/10 min | 36 | 35 | 38 | 37 | 29 |
| | Tensile yield strength | MPa | 25 | 24 | 24 | 24 | 26 |
| | Flexural modulus | MPa | 1250 | 1200 | 1130 | 1100 | 1230 |
| | Flexural strength | MPa | 32 | 31 | 30 | 30 | 31 |
| | Izod impact strength (−20° C.) | kJ/m$^2$ | 4.7 | 4.6 | 4.4 | 4.2 | 4.8 |

TABLE 3-continued

|  |  | Unit | Example 4 | Example 5 | Comparative Example 3 | Comparative Example 4 | Comparative Example 5 |
|---|---|---|---|---|---|---|---|
|  | FWI (−20° C.) | J | 19 | 22 | 18 | 18 | 15 |
|  | HDT | ° C. | 123 | 123 | 118 | 115 | 121 |
| Fish | ≥100 μm | Fish eyes/100 cm$^2$ | 940 | 590 | 950 | 950 | 800 |
| eye | ≥200 μm | Fish eyes/100 cm$^2$ | 10 | 10 | 10 | 10 | 70 |

[Common composition]
Component C: C-1/C-2/C-3:0.05/0.05/0.05 (part by weight)

Example 6

The operations were carried out in the same manner as in Example 1 except changing the propylene-block copolymer (A-1) to (A-3) and changing the Filter A to Filter B. The results are shown in Table 4. The propylene-based block copolymer (A-3) was prepared by a method similar to the method for the preparation of (A-1) described in Example 1 wherein polymerization conditions were adjusted so that properties of (A-3) were obtained.

Examples 7, 8

The operations were carried out in the same manner as in Example 3 except changing the nucleating agent (B-1) to (B-2) and also changing the compounding amounts. The results are shown in Table 4.

Comparative Example 6

The operations were carried out in the same manner as in Example 6 except adding no nucleating agent (B-1). The results are shown in Table 4.

Example 9

The operations were carried out in the same manner as in Example 8 except changing the Filter B to Filter C. The results are shown in Table 4.

It is shown that Example 1 is superior in rigidity (flexural modulus) and impact resistance (drop weight impact strength: FWI). In contrast, Comparative Example 1, where no nucleating agent was added, was poor in rigidity.

Examples 2 and 3 are superior in rigidity (flexural modulus). In contrast, Comparative Example 2, where a nucleating agent which does not satisfy a requirement of the present invention was added, was poor in rigidity.

Examples 4 and 5 are superior in rigidity (flexural modulus) and impact resistance (drop weight impact strength: FWI). In contrast, Comparative Examples 3 and 4, where a nucleating agent which does not satisfy a requirement of the present invention was added, were poor in rigidity.

Comparative Example 5, where a propylene copolymer which does not satisfy a requirement of the present invention, is poor in impact resistance (drop weight impact strength: FWI).

Examples 6, 7 and 8 are superior in rigidity (flexural modulus) and impact resistance (drop weight impact strength: FWI). In contrast, Comparative Example 6, where no nucleating agent was added, was poor in rigidity.

Example 9 is superior in rigidity (flexural modulus).

What is claimed is:

1. A polypropylene resin composition comprising:
(A) a propylene-based block copolymer satisfying requirements (a), (b), (c) and (d) defined below, and

TABLE 4

|  |  | Unit | Example 6 | Example 7 | Example 8 | Comparative Example 6 | Example 9 |
|---|---|---|---|---|---|---|---|
| Composition | Component A | part by weight | A-3 100 | A-3 100 | A-3 100 | A-3 100 | A-3 100 |
|  | Component B | part by weight | B-1 0.1 | B-2 0.03 | B-2 0.1 | Not added | B-2 0.1 |
| Melt-kneading conditions | Extrusion capacity | kg/hr | 16 | 16 | 16 | 16 | 16 |
|  | Filter | Type | Filter B | Filter B | Filter B | Filter B | Filter C |
|  |  | Filtration accuracy μm | 60 | 60 | 60 | 60 | 410 |
| Mechanical properties of molded article | MFR | g/10 min | 31 | 30 | 29 | 31 | 30 |
|  | Tensile yield strength | MPa | 27 | 27 | 27 | 26 | 27 |
|  | Flexural modulus | MPa | 1400 | 1350 | 1390 | 1180 | 1370 |
|  | Flexural strength | MPa | 36 | 35 | 36 | 32 | 36 |
|  | Izod impact strength (−20° C.) | kJ/m$^2$ | 4.6 | 4.2 | 4.7 | 3.7 | 4.4 |
|  | FWI (−20° C.) | J | 8.7 | 9.4 | 9.3 | 8.5 | 2.3 |
|  | HDT | ° C. | 128 | 127 | 127 | 112 | 126 |
| Fish | ≥100 μm | Fish eyes/100 cm$^2$ | 750 | 800 | 830 | 270 | 2450 |
| eye | ≥200 μm | Fish eyes/100 cm$^2$ | 10 | 30 | 20 | 0 | 480 |

[Common composition]
Component C: C-1/C-2/C-3:0.05/0.05/0.05 (part by weight)

(B) from 0.01 to 1.0 part by weight, based on 100 parts by weight of (A), of aluminum hydroxy-di-(p-tert-butylbenzoate) particles having an average particle diameter, as measured by the laser diffraction method, of from 0.01 to 3 µm wherein particles having particle diameters of not less than 10 µm account for less than 5% by weight of all the particles of aluminum hydroxy-di-(p-tert-butylbenzoate);

requirement (a): propylene-based block copolymer (A) is a propylene-based block copolymer including a polymer component (I) and a polymer component (II), wherein the polymer component (I) is a propylene polymer having an intrinsic viscosity as measured in Tetralin at 135° C., of from 0.1 to 5 dl/g and the polymer component (II) is a propylene polymer comprising propylene units and units of at least one comonomer selected from the group consisting of ethylene and α-olefins having 4-12 carbon atoms and having an intrinsic viscosity $[\eta]_{II}$, as measured in Tetralin at 135° C., of from 1 to 20 dl/g, requirement (b): the polymer component (I) has an isotactic pentad fraction, as measured by $^{13}$C-NMR, of 0.98 or more, requirement (c): the content of the units derived from at least one comonomer selected from the group consisting of ethylene and α-olefins having 4-12 carbon atoms included in the polymer component (II) is from 1 to 80% by weight, provided that the overall amount of the polymer component (II) is 100% by weight, and requirement (d): the content of the polymer component (II) is from 1 to 70% by weight, provided that the weight of the propylene-based block copolymer (A) is 100% by weight, wherein the polymer component (I) is a propylene-based polymer component composed of from 0.01 to 30% by weight, based on the overall amount of the polymer component (I), of units derived from at least one comonomer selected from the group consisting of ethylene and α-olefin having 4-12 carbon atoms and units derived from propylene and the content of 20° C. xylene-soluble component in the polymer component (I) less than 1.0% by weight.

2. The polypropylene resin composition according to claim 1, wherein in the propylene-based block copolymer (A) the ratio of the intrinsic viscosity $[\eta]_{II}$ of the polymer component (II) to the intrinsic viscosity $[\eta]_{I}$ of the polymer component (I) is from 1 to 20 and the content of the polymer component (II) is from 10 to 50% by weight and wherein the propylene-based block copolymer (A) has a melt flow rate, as measured at 230° C., of from 0.1 to 400 g/10 min.

3. A formed article made from the polypropylene resin composition according to claim 1.

4. A formed article made from the polypropylene resin composition according to claim 2.

5. The polypropylene resin composition according to claim 1, wherein the content of the aluminum hydroxy-di-(p-tert-butylbenzoate) particles (B) is from 0.01 to 0.5 parts by weight based on 100 parts by weight of the propylene-based block copolymer (A).

6. A formed article made from the propylene resin composition according to claim 5.

* * * * *